(12) United States Patent
Watarai et al.

(10) Patent No.: US 10,029,754 B2
(45) Date of Patent: Jul. 24, 2018

(54) BICYCLE ELECTRICAL SYSTEM

(71) Applicant: Shimano Inc., Sakai, Osaka (JP)

(72) Inventors: Etsuyoshi Watarai, Osaka (JP);
Takashi Toyoshima, Osaka (JP);
Tadaharu Kurotobi, Osaka (JP)

(73) Assignee: Shimano Inc., Osaka (JP)

( * ) Notice: Subject to any disclaimer, the term of this patent is extended or adjusted under 35 U.S.C. 154(b) by 157 days.

(21) Appl. No.: 15/010,329

(22) Filed: Jan. 29, 2016

(65) Prior Publication Data
US 2016/0257269 A1 Sep. 8, 2016

(30) Foreign Application Priority Data

Mar. 6, 2015 (JP) ................................. 2015-044818
Sep. 8, 2015 (JP) ................................. 2015-176946

(51) Int. Cl.
| | | |
|---|---|---|
| *B60L 1/00* | (2006.01) | |
| *B60L 3/00* | (2006.01) | |
| *H02G 3/00* | (2006.01) | |
| *B62J 99/00* | (2009.01) | |
| *B62M 25/08* | (2006.01) | |
| *H02J 50/00* | (2016.01) | |

(52) U.S. Cl.
CPC .............. *B62J 99/00* (2013.01); *B62M 25/08* (2013.01); *B62J 2099/004* (2013.01); *H02J 50/00* (2016.02)

(58) Field of Classification Search
CPC ...... B62J 99/00; B62J 2099/004; H02J 50/00; B62M 25/08
See application file for complete search history.

(56) References Cited

U.S. PATENT DOCUMENTS

| | | |
|---|---|---|
| 6,423,443 B1 | 7/2002 | Tsuboi et al. |
| 6,669,220 B2 | 12/2003 | Meggiolan |
| 6,896,277 B2 | 5/2005 | Meggiolan |
| 7,100,932 B2 | 9/2006 | Meggiolan |
| 7,267,352 B2 | 9/2007 | Ishikawa |
| 2005/0156001 A1 | 7/2005 | Dal Pra et al. |
| 2006/0058134 A1 | 3/2006 | Mercat et al. |

(Continued)

FOREIGN PATENT DOCUMENTS

| | | |
|---|---|---|
| CN | 104276254 A | 1/2015 |
| JP | 2015-27861 A | 2/2015 |

*Primary Examiner* — Jared Fureman
*Assistant Examiner* — Esayas Yeshaw
(74) *Attorney, Agent, or Firm* — Global IP Counselors, LLP

(57) ABSTRACT

A bicycle electrical system is provided with a first electric component, a second electric component, a first wireless communication unit, a first power source, and a second wireless communication unit. The first wireless communication unit and the first power source are electrically connected to at least the first electric component. The second wireless communication unit is electrically connected to at least the second electric component. The first electric component can communicate with the first wireless communication unit. The second electric component can communicate with the second wireless communication unit. At least the first wireless communication unit and the second wireless communication unit are attached to the bicycle without interposing the first electric component and the second electric component.

51 Claims, 17 Drawing Sheets

(56) References Cited

U.S. PATENT DOCUMENTS

| | | | |
|---|---|---|---|
| 2007/0000388 A1 | 1/2007 | Huang et al. | |
| 2007/0037645 A1* | 2/2007 | Ishikawa | B62M 9/132 474/80 |
| 2008/0168856 A1* | 7/2008 | Tetsuka | B62K 23/06 74/502.2 |
| 2009/0261134 A1 | 10/2009 | Tetsuka et al. | |
| 2009/0315692 A1* | 12/2009 | Miki | B62K 23/02 340/432 |
| 2011/0118084 A1* | 5/2011 | Tsai | A63B 24/0087 482/2 |
| 2012/0253600 A1* | 10/2012 | Ichida | B62K 19/36 701/37 |
| 2014/0087901 A1 | 3/2014 | Shipman et al. | |
| 2014/0102237 A1* | 4/2014 | Jordan | B62K 23/02 74/473.12 |
| 2014/0114538 A1 | 4/2014 | Shipman et al. | |
| 2014/0214285 A1* | 7/2014 | Wesling | F16H 59/02 701/51 |
| 2014/0358386 A1 | 12/2014 | Cracco et al. | |
| 2014/0358387 A1 | 12/2014 | Cracco et al. | |
| 2015/0009019 A1 | 1/2015 | Watarai et al. | |
| 2015/0180517 A1* | 6/2015 | Abe | G08C 17/00 455/99 |

* cited by examiner

BICYCLE ELECTRICAL SYSTEM

CROSS-REFERENCE TO RELATED APPLICATIONS

This application claims priority to Japanese Patent Application No. 2015-044818, filed on Mar. 6, 2015 and Japanese Patent Application No. 2015-176946, filed on Sep. 8, 2015. The entire disclosures of Japanese Patent Application No. 2015-044818 and Japanese Patent Application No. 2015-176946 are hereby incorporated herein by reference.

BACKGROUND

Field of the Invention

The present invention relates to a bicycle electrical system.

For example, Japanese Patent No. 5,211,102 is known as a bicycle electrical system. This electrical system connects all the operating devices, the control devices, the electric components, and the power source via the wires.

SUMMARY

There is a demand for a bicycle electrical system having greater convenience regarding the connections between the operating devices, the control devices, the electric components, and the power source, as well as attachment to a bicycle.

One object of the present invention is to provide a bicycle electrical system which can contribute to an improvement of convenience.

In accordance with a first aspect of the present invention, the bicycle electrical system according to the present invention is a bicycle electrical system comprising a first electric component, a second electric component, a first wireless communication unit, a first power source, and a second wireless communication unit. The first wireless communication unit and the first power source are electrically connected to at least the first electric component. The second wireless communication unit is electrically connected to at least the second electric component. The first electric component can communicate with the first wireless communication unit. The second electric component can communicate with the second wireless communication unit. At least the first wireless communication unit and the second wireless communication unit are configured to be attached to a bicycle without interposing the first electric component and the second electric component.

In accordance with a second aspect of the present invention, the bicycle electrical system is configured so that the first wireless communication unit is electrically connected to the first electric component via a first signal line, and the second wireless communication unit is electrically connected to the second electric component via a second signal line.

In accordance with a third aspect of the present invention, the bicycle electrical system is configured so that the first power source is configured to be attached to the bicycle without interposing the first electric component and the second electric component.

In accordance with a fourth aspect of the present invention, the bicycle electrical system is configured so that the first power source, the first wireless communication unit and the second wireless communication unit are configured to be attached to the different positions of the bicycle.

In accordance with a fifth aspect of the present invention, the bicycle electrical system is configured so that the first power source and the first wireless communication unit, and the second wireless communication unit are configured to be attached to the different positions of the bicycle.

In accordance with a sixth aspect of the present invention, the bicycle electrical system is configured so that the first power source is attached to the first electric component or the second electric component.

In accordance with a seventh aspect of the present invention, the bicycle electrical system is configured so that the first power source is attached to the first electric component, and the first power source is electrically connected to the second electric component.

In accordance with an eighth aspect of the present invention, the bicycle electrical system further comprises a second power source, wherein the second power source is electrically connected to at least the second electric component.

In accordance with a ninth aspect of the present invention, the bicycle electrical system is configured so that the second power source is configured to be attached to the bicycle without interposing the first electric component and the second electric component.

In accordance with a tenth aspect of the present invention, the bicycle electrical system is configured so that the first power source, the second power source, the first wireless communication unit, and the second wireless communication unit are configured to be attached to the different positions of the bicycle.

In accordance with an eleventh aspect of the present invention, the bicycle electrical system is configured so that the first power source and the first wireless communication unit, and the second power source, and the second wireless communication unit are configured to be attached to the different positions of the bicycle.

In accordance with a twelfth aspect of the present invention, the bicycle electrical system is configured so that the second power source is attached to the first electric component or the second electric component.

In accordance with a thirteenth aspect of the present invention, the bicycle electrical system further comprises a first housing for housing at least a part of at least the first wireless communication unit and at least a part of the first power source, and a second housing for housing at least a part of at least the second wireless communication unit. The first housing and the second housing are configured to be attached to the bicycle without interposing the first electric component and the second electric component.

In accordance with a fourteenth aspect of the present invention, the bicycle electrical system is configured so that the first wireless communication unit comprises a first connecting part and a first housing portion. The first power source comprises a second connecting part and a second housing portion. The first connecting part and the second connecting part are joined to supply power from the first power source to the first wireless communication unit. The first housing includes the first housing portion and the second housing portion.

In accordance with a fifteenth aspect of the present invention, the bicycle electrical system further comprises a second power source. The second power source is electrically connected to at least the second electric component. The second housing houses at least the second wireless communication unit and the second power source.

In accordance with a sixteenth aspect of the present invention, the bicycle electrical system is configured so that the second wireless communication unit comprises a third connecting part and a third housing portion. The second power source comprises a fourth connecting part and a fourth housing portion. The third connecting part and the fourth connecting part are joined to supply power from the second power source to the second wireless communication unit. The second housing includes the third housing portion and the fourth housing portion.

In accordance with a seventeenth aspect of the present invention, the bicycle electrical system is configured so that the first housing and the second housing are substantially the same shape.

In accordance with an eighteenth aspect of the present invention, the bicycle electrical system is configured so that at least one of the first housing and the second housing is configured to be attached to a frame main body of the bicycle.

In accordance with a nineteenth aspect of the present invention, the bicycle electrical system is configured so that at least one of the first housing and the second housing is configured to be attached to a chain stay of the bicycle.

In accordance with a twentieth aspect of the present invention, the bicycle electrical system is configured so that at least one of the first housing and the second housing is configured to be attached to a seat tube of the bicycle.

In accordance with a twenty-first aspect of the present invention, the bicycle electrical system is configured so that at least one of the first housing and the second housing is configured to be attached to a seatpost of the bicycle.

In accordance with a twenty-second aspect of the present invention, the bicycle electrical system is configured so that at least one of the first housing and the second housing is configured to be attached to a front fork of the bicycle.

In accordance with a twenty-third aspect of the present invention, the bicycle electrical system is configured so that at least one of the first housing and the second housing is configured to be attached to a hub assembly of the bicycle.

In accordance with a twenty-fourth aspect of the present invention, the bicycle electrical system is configured so that at least one of the first housing and the second housing is configured to be attached to a suspension device of the bicycle.

In accordance with a twenty-fifth aspect of the present invention, the bicycle electrical system is configured so that the first housing and the second housing are configured to be detachably attached to the bicycle.

In accordance with a twenty-sixth aspect of the present invention, the bicycle electrical system is configured so that the first housing and the second housing are configured to be attached to the bicycle by an attaching member.

In accordance with a twenty-seventh aspect of the present invention, the bicycle electrical system is configured so that the attaching member comprises at least one of an adhesive, a screw, a cable tie, or a double-sided tape.

In accordance with a twenty-eighth aspect of the present invention, a bicycle electrical system is provided that comprises a first electric component and a first wireless communication unit. The first wireless communication unit is electrically connected to the first electric component. The first electric component can communicate with the first wireless communication unit. The first wireless communication unit is configured to be detachably attached to the first electric component.

In accordance with a twenty-ninth aspect of the present invention, the bicycle electrical system, the first electric component comprises a first base member that can be attached to the bicycle. The first wireless communication unit is configured to be detachably attached to the first base member.

In accordance with a thirtieth aspect of the present invention, the bicycle electrical system further comprises a first power source attached to the first electric component.

In accordance with a thirty-first aspect of the present invention, the bicycle electrical system is configured so that the first electric component comprises a first base member that can be attached to the bicycle. The first power source is configured to be detachably attached to the first base member.

In accordance with a thirty-second aspect of the present invention, the bicycle electrical system is configured so that the first wireless communication unit is electrically connected to the first electric component via a first signal line.

In accordance with a thirty-third aspect of the present invention, the bicycle electrical system further comprises a second electric component and a second wireless communication unit. The second wireless communication unit is electrically connected to the second electric component. The second electric component is configured to communicate with the second wireless communication unit. The second wireless communication unit is configured to be detachably attached to the second electric component.

In accordance with a thirty-fourth aspect of the present invention, the bicycle electrical system is configured so that the second electric component comprises a second base member that is configured to be attached to the bicycle. The second wireless communication unit is configured to be detachably attached to the second base member.

In accordance with a thirty-fifth aspect of the present invention, the bicycle electrical system further comprises a second power source that is attached to the second electric component.

In accordance with a thirty-sixth aspect of the present invention, the bicycle electrical system, the second electric component comprises a second base member that can be attached to the bicycle. The second power source is detachably attached to the second base member.

In accordance with a thirty-seventh aspect of the present invention, the bicycle electrical system is configured so that the second wireless communication unit is electrically connected to the second electric component via a second signal line.

In accordance with a thirty-eighth aspect of the present invention, the bicycle electrical system according to the present invention is a bicycle electrical system comprising a first electric component, a second electric component, a first wireless communication unit, a first power source, and a second wireless communication unit. The first wireless communication unit and the first power source are electrically connected to at least the first electric component. The second wireless communication unit is electrically connected to at least the second electric component. The first electric component can communicate with the first wireless communication unit. The second electric component can communicate with the second wireless communication unit. The first wireless communication unit and the first power source are attached to the first electric component. The second wireless communication unit is configured to be attached to the bicycle without interposing the first electric component and the second electric component.

In accordance with a thirty-ninth aspect of the present invention, the bicycle electrical system comprises an operating unit and a third wireless communication unit which transmits a gear changing signal wirelessly to at least one of the first wireless communication unit and the second wireless communication unit. The third wireless communication unit is configured to be attached to the bicycle without interposing the first electric component and the second electric component.

In accordance with a fortieth aspect of the present invention, the bicycle electrical system further comprises a third power source that is electrically connected to at least the operating unit.

In accordance with a forty-first aspect of the present invention, the bicycle electrical system comprises a third housing that houses at least a part of the third wireless communication unit and at least a part of the third power source. The third housing is attached to the bicycle without interposing the first electric component and the second electric component.

In accordance with a forty-second aspect of the present invention, the bicycle electrical system is configured so that the first housing, the second housing, and the third housing are substantially the same shape.

In accordance with a forty-third aspect of the present invention, the bicycle electrical system is configured so that the second electric component comprises a second actuator that is operated based on a signal from the second wireless communication unit.

In accordance with a forty-fourth aspect of the present invention, the bicycle electrical system is configured so that the first electric component comprises a first actuator that is operated based on a signal from the first wireless communication unit.

In accordance with a forty-fifth aspect of the present invention, the bicycle electrical system is configured so that the second electric component comprises a second storage unit, and information stored in the second storage unit is updated based on a communication with the second wireless communication unit.

In accordance with a forty-sixth aspect of the present invention, the bicycle electrical system is configured so that the first electric component comprises a first storage unit, and information stored in the first storage unit is updated based on a communication with the first wireless communication unit.

In accordance with a forty-seventh aspect of the present invention, the bicycle electrical system is configured so that at least one of the first and the second electric component is an electric transmitter.

In accordance with a forty-eighth aspect of the present invention, the bicycle electrical system is configured so that one of the first and the second electric component is an electric front derailleur, and the other of the first and the second electric component is an electric rear derailleur.

In accordance with a forty-ninth aspect of the present invention, the bicycle electrical system is configured so that at least one of the first and the second electric component is an electric seatpost.

In accordance with a fiftieth aspect of the present invention, the bicycle electrical system is configured so that at least one of the first and the second electric component is an electric suspension.

In accordance with a fifty-first aspect of the present invention, the bicycle electrical system is configured so that at least one of the first and the second electric component is a drive unit comprising a motor for assisting a human power drive force which is inputted to a crank.

The above-described bicycle electrical system can contribute to the improvement of convenience.

DETAILED DESCRIPTION OF EMBODIMENTS

Figure 1:
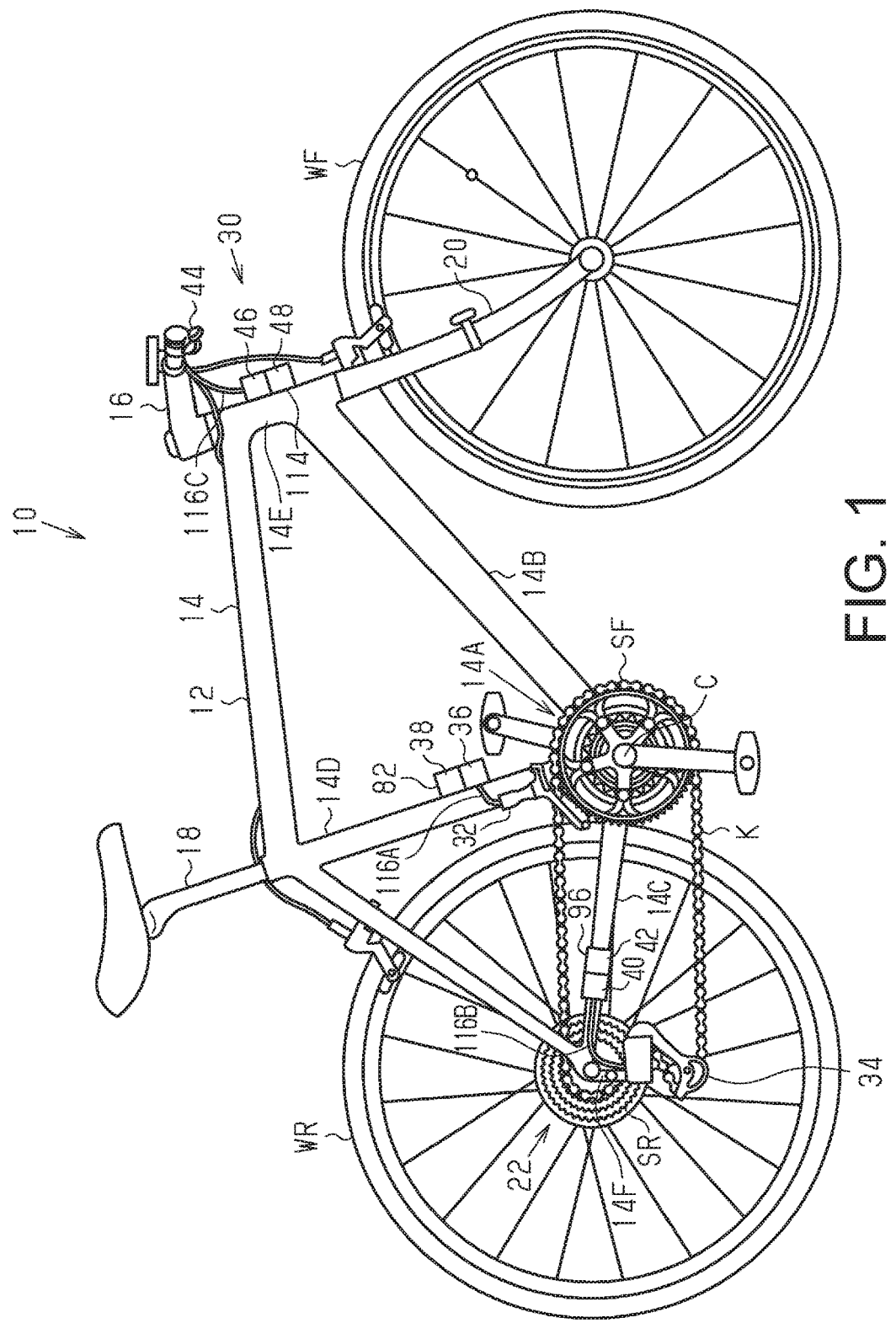
FIG. 1 is a side elevational view of a bicycle equipped with an electrical system of a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Referring initially to FIGS. 1 to 5, a bicycle 10 is illustrated that comprises a vehicle body 12, a frame main body 14, a handlebar 16, a seatpost 18, a front fork 20 and a hub assembly 22. The vehicle body 12 of the bicycle 10 is equipped with a bicycle electrical system 30 in accordance with a first embodiment. The handlebar 16 is connected to the frame main body 14. The seatpost 18 is connected to the frame main body 14. The front fork 20 is connected to the frame main body 14. The hub assembly 22 is attached around the axle of a rear wheel WR.

The frame main body 14 comprises a support portion 14A, a down tube 14B, a chain stay 14C, a seat tube 14D and a head tube 14E. The down tube 14B extends forward from the support portion 14A which supports a crankshaft C. The chain stay 14C extends rearward from the support portion 14A. The seat tube 14D extends upward from the support portion 14A. The head tube 14E extends upward from the end on the opposite side of the support portion 14A of the down tube 14B.

The handlebar 16 is detachably attached to the head tube 14E. The seatpost 18 is detachably attached to the seat tube 14D. The front fork 20 is supported to the head tube 14E and connects the handlebar 16 and the axle of a front wheel WF. The hub assembly 22 is attached around the axle of the rear wheel WR.

The electrical system 30 comprises an electric front derailleur 32 (hereinafter referred to as "front derailleur 32"), an electric rear derailleur 34 (hereinafter referred to as "rear derailleur 34"), a first wireless communication unit 36, a first power source 38, a second wireless communication unit 40, a second power source 42, an operating unit 44, a third wireless communication unit 46, and a third power source 48. The front derailleur 32 is a first electric component. The front derailleur 32 is an electric transmitter. The rear derailleur 34 is a second electric component. The rear derailleur 34 is an electric transmitter. Each of the electric components includes an actuator and the mechanical elements which are operated by the driving of the actuator.

Figure 2:
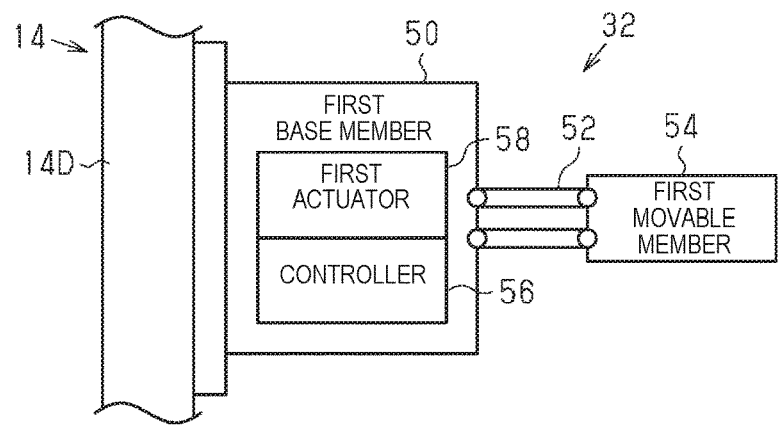
FIG. 2 is a schematic view of the electrical system of the front derailleur illustrated in FIG. 1.

The front derailleur 32 is attached to the frame main body 14 in the vicinity of the crankshaft C, preferably to the seat tube 14D. As shown in FIG. 2, the front derailleur 32 comprises a first base member 50, a link member 52, a first movable member 54, a controller 56, and a first actuator 58.

The first base member 50 is configured to be attached to the frame main body 14 via a bolt or the like. The link member 52 connects the first base member 50 and the first movable member 54 so that the first movable member 54 is movable relative to the first base member 50. The first movable member 54 supports a chain K (refer to the FIG. 1). The controller 56 has a processor for executing various programs to drive the first actuator 58. The controller 56 moves the link member 52 and the first movable member 54 with respect to the first base member 50 by driving the first actuator 58 which is connected to the link member 52. The front derailleur 32 switches the chain K (refer to the FIG. 1) between a plurality of the front sprockets SF (refer to FIG. 1) and changes the gear ratio of the bicycle 10, by driving the first actuator 58.

Figure 3:
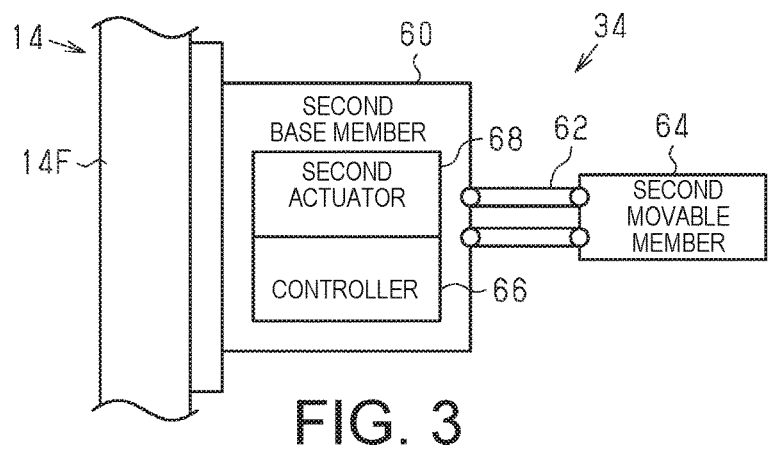
FIG. 3 is a schematic view of the electrical system rear derailleur illustrated in FIG. 1.

As shown in FIG. 1, the rear derailleur 34 is attached to the frame main body 14 in the vicinity of the hub assembly 22, preferably, to a derailleur hanger 14F which is provided to the rear end of the frame main body 14. As shown in FIG. 3, the rear derailleur 34 comprises a second base member 60, a link member 62, a second movable member 64, a controller 66, and a second actuator 68.

The second base member 60 is configured to be attached to the frame main body 14 via a bolt or the like. The link member 62 connects the second base member 60 and the second movable member 64 so that the second movable member 64 is movable relative to the second base member 60. The second movable member 64 supports the chain K (refer to FIG. 1). The controller 66 has a processor for executing various programs to drive the second actuator 68. The controller 66 moves the link member 62 and the second movable member 64 with respect to the second base member 60 by driving the second actuator 68 which is connected to the link member 62. The rear derailleur 34 switches the chain K (refer to FIG. 1) between a plurality of the rear sprockets SR (refer to FIG. 1) and changes the gear ratio of the bicycle 10, by driving the second actuator 68.

Figure 4:
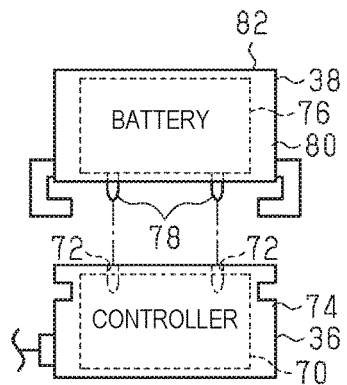
FIG. 4 is a schematic view of the first housing illustrated in FIG. 1.

As shown in FIG. 4, the first wireless communication unit 36 comprises a controller 70 that has a processor for performing various calculations, a first connecting part 72, and a first housing portion 74 for housing the controller 70. At least a part of the first connecting part 72 is exposed from the first housing portion 74.

The first power source 38 comprises a battery 76, a second connecting part 78, and a second housing portion 80 which houses the battery 76. The battery 76 can be a rechargeable battery or a dry battery. The battery 76 is, for example, a lithium ion battery. At least a part of the second connecting part 78 is exposed from the second housing portion 80. The second connecting part 78 has a shape that is complementary to the first connecting part 72, and is configured to be connectable to the first connecting part 72.

Power from the first power source 38 is supplied to the first wireless communication unit 36, with the first connecting part 72 and the second connecting part 78 being joined. The first housing portion 74 and the second housing portion 80 define the first housing 82, while the first connecting part 72 and the second connecting part 78 are joined together. The first housing 82 houses the controller 70, which is at least a part of the first wireless communication unit 36, and the battery 76 which is at least a part of the first power source 38.

As shown in FIG. 1, the first housing 82 is attached to the frame main body 14 in the vicinity of the front derailleur 32, preferably to the seat tube 14D. The first housing 82 has a shape which corresponds to the shape of the portion of the frame main body 14 to which is attached the first housing 82. The first housing 82 is detachably attached to the bicycle 10 by an attaching member AT shown in FIG. 5. The attaching member AT comprises at least one of an adhesive, a screw, a cable tie, or a double-sided tape.

As shown in FIG. 1, the first housing 82 is attached to the bicycle 10 without interposing the front derailleur 32 and the rear derailleur 34. Accordingly, the first wireless communication unit 36 and the first power source 38 are attached to the bicycle 10 without interposing the front derailleur 32 and the rear derailleur 34.

Figure 5:
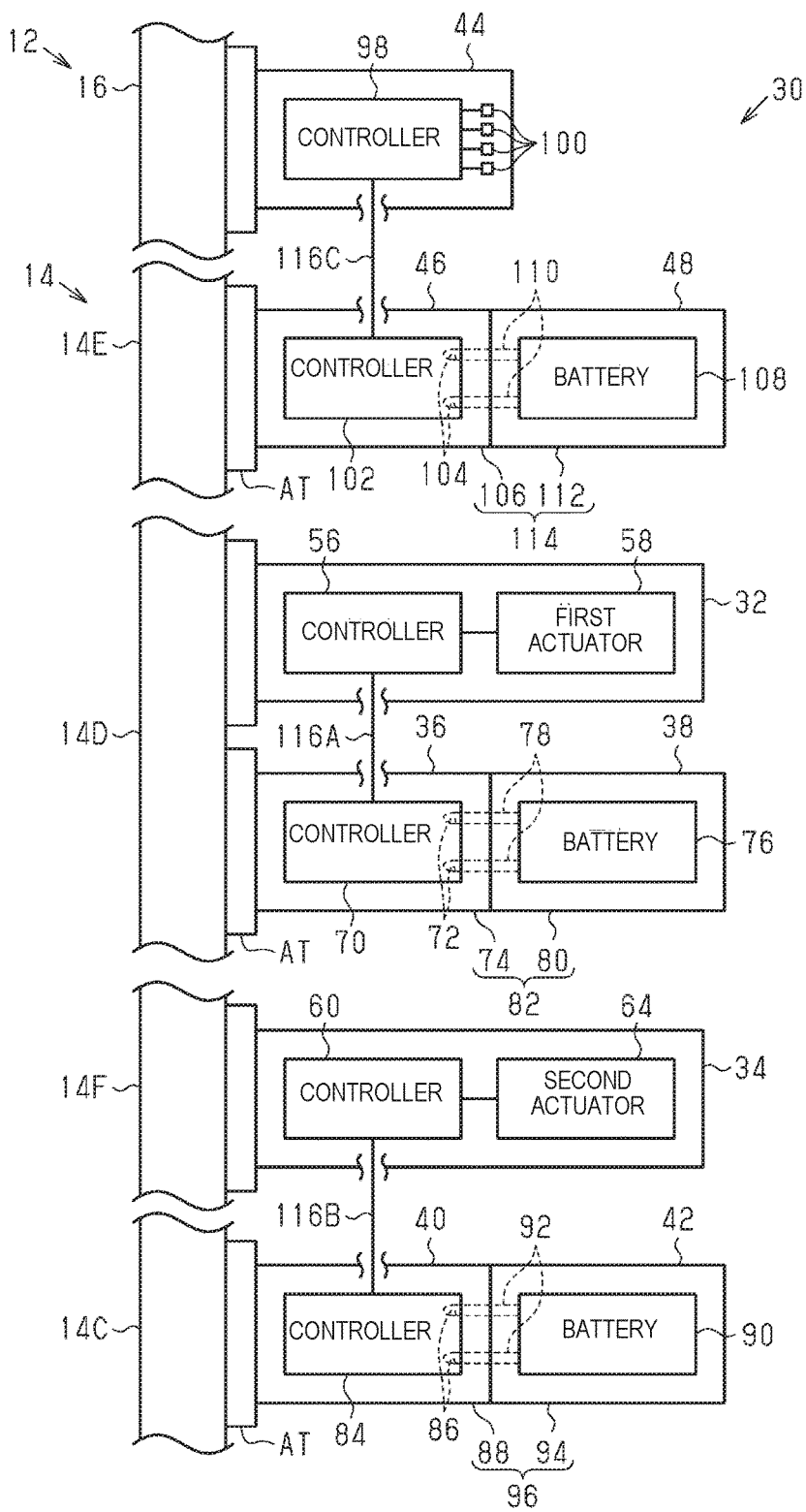
FIG. 5 is a block diagram of the electrical system illustrated in FIG. 1.

As shown in FIG. 5, the second wireless communication unit 40 comprises a controller 84 that has a processor for performing various calculations, a third connecting part 86, and a third housing portion 88 for housing the controller 84. At least a part of the third connecting part 86 is exposed from the third housing portion 88.

The second power source 42 comprises a battery 90, a fourth connecting part 92, and a fourth housing portion 94 which houses the battery 90. The battery 90 can be a rechargeable battery or a dry battery. The battery 90 is, for example, a lithium ion battery. At least a part of the fourth connecting part 92 is exposed from the fourth housing portion 94. The fourth connecting part 92 has a shape that is complementary to the third connecting part 86, and is configured to be connectable to the third connecting part 86.

Power from the second power source 42 is supplied to the second wireless communication unit 40, with the third connecting part 86 and the fourth connecting part 92 being joined. The third housing portion 88 and the fourth housing portion 94 define the second housing 96, while the third connecting part 86 and the fourth connecting part 92 are joined together. The second housing 96 houses the controller 84, which is at least a part of the second wireless communication unit 40, and the battery 90 which is at least a part of the second power source 42. The shape of the first housing 82 is substantially the same as the shape of the second housing 96.

As shown in FIG. 1, the second housing 96 is attached to the frame main body 14 in the vicinity of the rear derailleur 34, preferably to the chain stay 14C. The second housing 96 has a shape which corresponds to the shape of the portion of the frame main body 14 to which is attached the second housing 96. The second housing 96 is detachably attached to the bicycle 10 by an attaching member AT shown in FIG. 4.

As shown in FIG. 1, the second housing 96 is attached to the bicycle 10 without interposing the front derailleur 32 and the rear derailleur 34. Accordingly, the second wireless communication unit 40 and the second power source 42 are attached to the bicycle 10 without interposing the front derailleur 32 and the rear derailleur 34.

The first housing 82 and the second housings 96 are attached to different positions of the bicycle 10. Accordingly, the first power source 38 and the first wireless communication unit 36, and the second power source 42 and the second wireless communication unit 40, are attached to the different positions of the bicycle 10.

As shown in FIG. 5, the operating unit 44 is attached to the handlebar 16. The operating unit 44 comprises a controller 98, and a plurality of switches 100 which are electrically connected to the controller 98. The switches 100 are respectively associated with the shifting operation of the front derailleur 32 and/or the rear derailleur 34. The controller 98 has a processor for performing various calculations.

The third wireless communication unit 46 comprises a controller 102 with a processor for performing various calculations, a fifth connecting part 104, and a fifth housing portion 106 for housing the controller 102. At least a part of the fifth connecting part 104 is exposed from the fifth housing portion 106.

The third power source 48 comprises a battery 108, a sixth connecting part 110, and a sixth housing portion 112 which houses the battery 108. The battery 108 can be a rechargeable battery or a dry battery. The battery 108 is, for example, a lithium ion battery. At least a part of the sixth connecting part 110 is exposed from the sixth housing portion 112. The sixth connecting part 110 has a shape that is complementary to the fifth connecting part 104. The sixth connecting part 110 is configured to be connectable to the fifth connecting part 104.

Power from the third power source 48 is supplied to the third wireless communication unit 46, with the fifth connecting part 104 and the sixth connecting part 110 being joined. The fifth housing portion 106 and the sixth housing portion 112 define the third housing 114, while the fifth connecting part 104 and the sixth connecting part 110 are joined together. The third housing 114 houses the controller 102, which is at least a part of the third wireless communication unit 46, and the battery 108 which is at least a part of the third power source 48. The shape of the third housing 114 is substantially the same as the shape of the first housing 82 and the shape of the second housing 96.

As shown in FIG. 1, the third housing 114 is attached to the handlebar 16 or the frame main body 14 in the vicinity of the handlebar 16. When attached to the frame main body 14, the third wireless communication unit 46 is preferably attached to the head tube 14E or the down tube 14B. The third housing 114 has a shape which corresponds to the shape of the portion of the frame main body 14 or the handlebar 16 to which is attached the third housing 114. The third housing 114 is detachably attached to the bicycle 10 by an attaching member AT shown in FIG. 5.

As shown in FIG. 1, the third housing 114 is attached to the bicycle 10 without interposing the front derailleur 32 and the rear derailleur 34. Accordingly, the third wireless communication unit 46 and the third power source 48 are attached to the bicycle 10 without interposing the front derailleur 32 and the rear derailleur 34.

The configuration of the electrical system 30 will be described with reference to FIG. 5.

The front derailleur 32, the rear derailleur 34, the first wireless communication unit 36, the first power source 38, the second wireless communication unit 40, and the second power source 42 are able to transmit the signals and the power by a power line communication (the Power Line Communication; PLC). Therefore, compared to when respectively transmitting the signals by a signal line and the power by a power line, the wiring is simpler and the convenience is improved.

The first wireless communication unit 36 is electrically connected to the controller 56 of the front derailleur 32 via the first signal line 116A. The first power source 38 is electrically connected to the front derailleur 32 via the first wireless communication unit 36. The first power source 38 supplies power to the first wireless communication unit 36 and the front derailleur 32.

The second wireless communication unit 40 is electrically connected to the controller 66 of the rear derailleur 34 via the second signal line 116B. The second power source 42 is electrically connected to the rear derailleur 34 via the second wireless communication unit 40. The second power source 42 supplies power to the second wireless communication unit 40 and the rear derailleur 34.

The third wireless communication unit 46 is electrically connected to the controller 44 via the third signal line 116C. The third power source 48 is electrically connected to the operating unit 44 via the third wireless communication unit 46. The third power source 48 supplies power to the third wireless communication unit 46 and the operating unit 44.

The operation of the electrical system 30 will be described.

When a switch 100 is operated, the controller 98 of the operating unit 44 outputs an operation signal corresponding to the third wireless communication unit 46 via the third signal line 116C. The controller 102 of the third wireless communication unit 46 wirelessly transmits a gear changing signal to at least one of the first wireless communication unit 36 and the second wireless communication unit 40 based on an operation signal which is inputted from the operating unit 44.

When receiving a gear changing signal comprising a shifting operation of the front derailleur 32 from the third wireless communication unit 46, the controller 70 of the first wireless communication unit 36 outputs a control signal to the front derailleur 32. The controller 56 of the front derailleur 32 performs a shifting operation based on a control signal from the first wireless communication unit 36. That is, the front derailleur 32 operates the first actuator 58 based on a signal from the first wireless communication unit 36.

When receiving a gear changing signal comprising a shifting operation of the rear derailleur 34 from the third wireless communication unit 46, the controller 84 of the second wireless communication unit 40 outputs a control signal to the rear derailleur 34. The controller 66 of the rear derailleur 34 performs a shifting operation based on a control signal from the second wireless communication unit 40. That is, the rear derailleur 34 operates the second actuator 68 based on a signal from the second wireless communication unit 40.

The electrical system 30 exerts the following effect.

(1) In the electrical system 30, the wireless communication units 36 and 40 are electrically connected to the front derailleur 32 and the rear derailleur 34. Accordingly, the wiring between the front derailleur 32 and the rear derailleur 34 and the operating unit 44 in the bicycle 10 can be omitted. Accordingly, the wiring is simplified, and contributes to the improvement in the convenience of the electrical system.

(2) The first wireless communication unit 36 and the second wireless communication unit 40 are attached to the bicycle 10 without interposing the front derailleur 32 and the rear derailleur 34. Accordingly, the front derailleur 32 and the rear derailleur 34 do not need to be large.

(3) The first power source 38 and the second power source 42 are attached to the bicycle 10 without interposing the front derailleur 32 and the rear derailleur 34. Accordingly, the front derailleur 32 and the rear derailleur 34 do not need to be large.

(4) The electrical system 30 comprises a second power source 42. Accordingly, compared to a configuration in which the power is shared from the first power source 38 to the rear derailleur 34 and the second wireless communication unit 40, the wiring can be simplified.

(5) The first wireless communication unit 36 and the first power source 38 are attached in the vicinity of the front derailleur 32. Accordingly, the first signal line 116A which connects the front derailleur 32 with the first wireless communication unit 36 and the first power source 38 can be shortened.

(6) The second wireless communication unit 40 and the second power source 42 are attached in the vicinity of the rear derailleur 34. Accordingly, the second signal line 116B which connects the rear derailleur 34 with the second wireless communication unit 40 and the second power source 42 can be shortened.

(7) The first wireless communication unit 36 and the first power source 38 are housed in the first housing 82. Accordingly, since the first wireless communication unit 36 and the first power source 38 can be attached to the bicycle 10 by attaching the first housing 82 to the bicycle 10 the convenience can be improved.

(8) The second wireless communication unit 40 and the second power source 42 are housed in the second housing 96. Accordingly, since the second wireless communication unit 40 and the second power source 42 can be attached to the bicycle 10 by attaching the second housing 96 to the bicycle 10, the convenience can be improved.

(9) The electrical system 30 comprises a third power source 48. Accordingly, compared to a configuration in which the power is shared from the first power source 38 or the second power source 42 to the operating unit 44 and the third wireless communication unit 46, the wiring can be simplified.

(10) The shape of the first housing 82, the shape of the second housing 96, and the shape of the third housing 114 are substantially the same. Accordingly, the first housing 82, the second housing 96, and the third housing 114 can be attached to the bicycle 10 by a similarly shaped attaching member AT.

Second Embodiment

Figure 6:
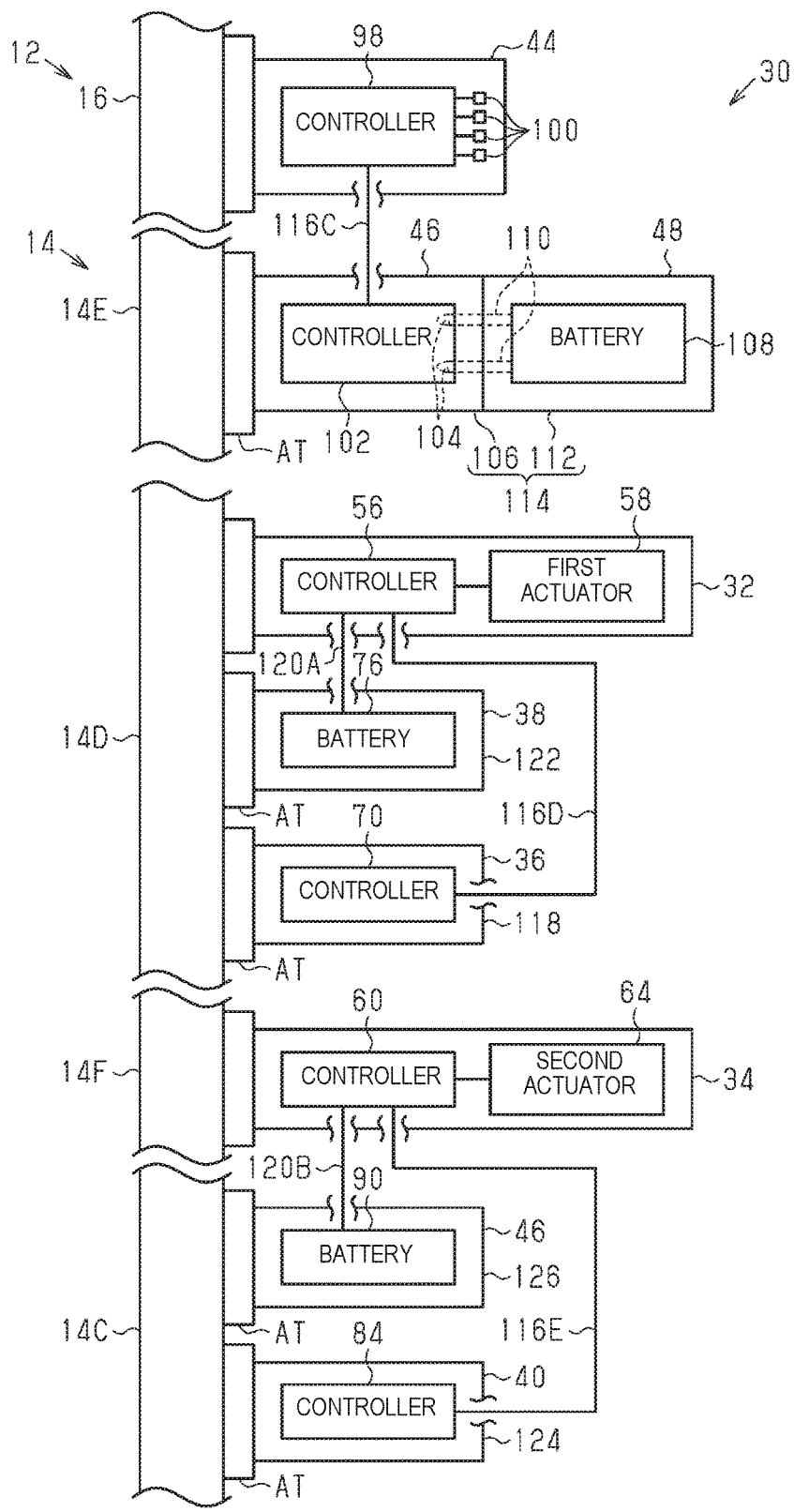
FIG. 6 is a block diagram of the electrical system according to a second embodiment.

The electrical system 30 of the second embodiment will be described with reference to FIG. 6. The configurations that are common to the first embodiment are given the same reference symbols as the first embodiment, and the descriptions thereof will be omitted.

The first wireless communication unit 36 comprises the controller 70 that has a processor for performing various calculations, and a fourth housing 118 for housing the controller 70. The controller 70 is connected to the controller 56 of the front derailleur 32 by a fourth communication line 116D.

The fourth housing 118 is attached to the frame main body 14 in the vicinity of the front derailleur 32, preferably to the seat tube 14D. The fourth housing 118 is attached to the bicycle 10 by the attaching member AT. The fourth housing 118 is attached to the bicycle 10 without interposing a front derailleur 32 and a rear derailleur 34. Accordingly, the first wireless communication unit 36 is attached to the bicycle 10 without interposing the front derailleur 32 and the rear derailleur 34.

The first power source 38 comprises the battery 76, and a fifth housing 122 which houses the battery 76. The battery 76 is connected to the controller 56 of the front derailleur 32 by a first power line 120A. The first power source 38 supplies power to the front derailleur 32 via the first power line 120A. The first power source 38 supplies power to the first wireless communication unit 36 via the front derailleur 32.

The fifth housing 122 is attached to the frame main body 14 in the vicinity of the front derailleur 32, preferably to the seat tube 14D. The fifth housing 122 is attached to the bicycle 10 by the attaching member AT. The fifth housing 122 is attached to the bicycle 10 without interposing a front derailleur 32 and a rear derailleur 34. Accordingly, the first power source 38 is attached to the bicycle 10 without interposing the front derailleur 32 and the rear derailleur 34.

The second wireless communication unit 40 comprises the controller 84 that has a processor for performing various calculations, and a sixth housing 124 for housing the controller 84. The controller 84 is connected to the controller 66 of the rear derailleur 34 by a fifth communication line 116E.

The sixth housing 124 is attached to the frame main body 14 in the vicinity of the rear derailleur 34, preferably to the chain stay 14C. The sixth housing 124 is attached to the bicycle 10 by an attaching member AT. The sixth housing 124 is attached to the bicycle 10 without interposing the front derailleur 32 and the rear derailleur 34. Accordingly, the second wireless communication unit 40 is attached to the bicycle 10 without interposing the front derailleur 32 and the rear derailleur 34.

The second power source 42 comprises the battery 90, and a seventh housing 126 which houses the battery 90. The battery 76 is connected to the controller 66 of the rear derailleur 34 by a second power line 120B. The second power source 42 supplies power to the rear derailleur 34 via the second power line 120B. The second power source 42 supplies power to the second wireless communication unit 40 via the rear derailleur 34.

The seventh housing 126 is attached to the frame main body 14 in the vicinity of the front derailleur 32, preferably to the seat tube 14D. The seventh housing 126 is attached to the bicycle 10 by the attaching member AT. The seventh housing 126 is attached to the bicycle 10 without interposing the front derailleur 32 and the rear derailleur 34. Accordingly, the second power source 42 is attached to the bicycle 10 without interposing the front derailleur 32 and the rear derailleur 34.

The fourth housing 118, the fifth housing 122, the sixth housing 124, and the seventh housing 126 are attached to different positions of the bicycle 10. Accordingly, the first power source 38, the first wireless communication unit 36, the second power source 42, and the second wireless communication unit 40, are attached to different positions of the bicycle 10. According to the electrical system 30 of the second embodiment, at least the effects of (1) and (2) of the first embodiment can be achieved.

Third Embodiment

Figure 7:
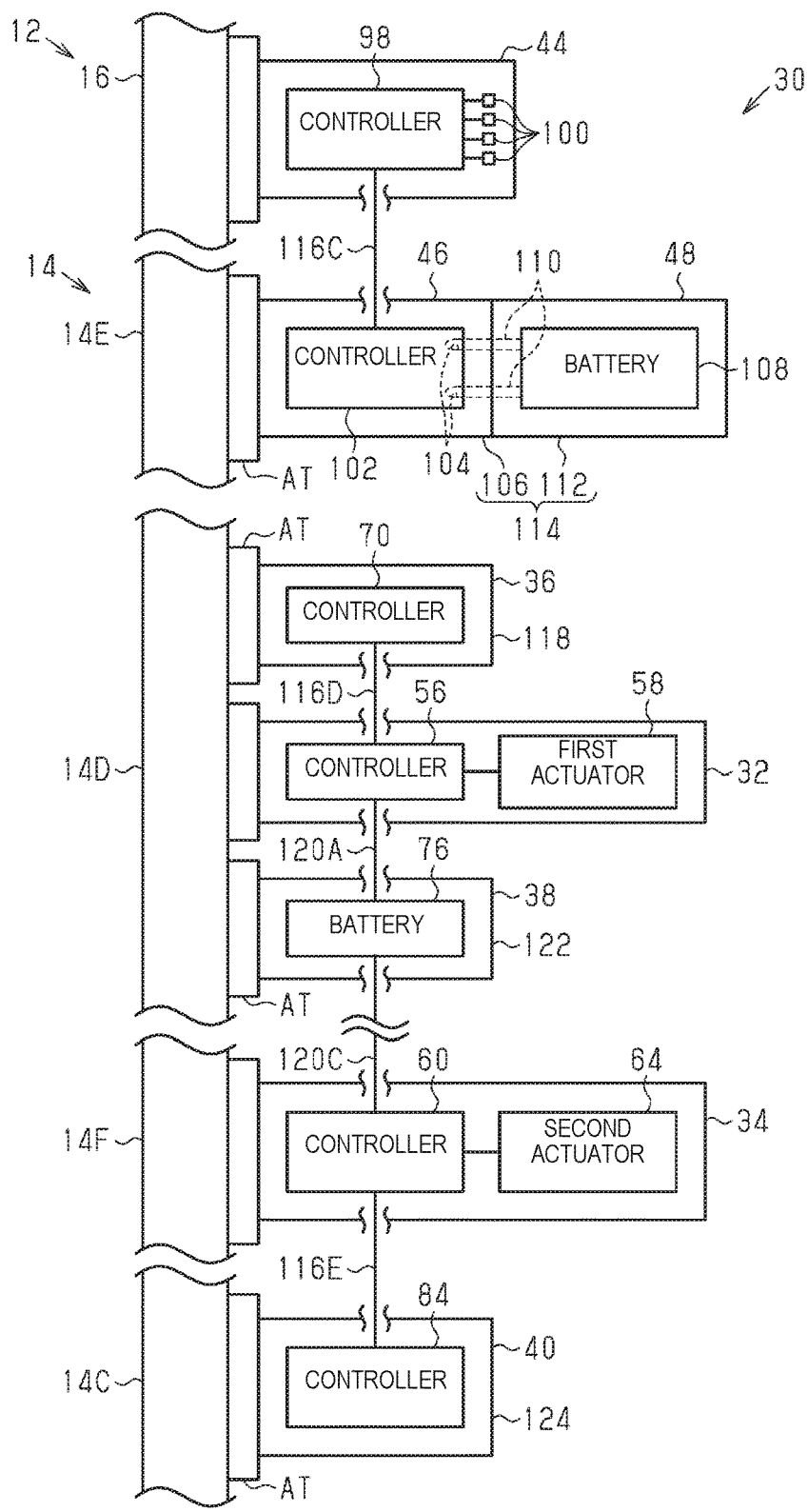
FIG. 7 is a block diagram of the electrical system according to a third embodiment.

The electrical system 30 of the third embodiment will be described with reference to FIG. 7. The configurations that are common to the second embodiment are given the same reference symbols as the second embodiment, and the descriptions thereof will be omitted.

The electrical system 30 comprises the front derailleur 32, the rear derailleur 34, the first wireless communication unit 36, the first power source 38, the second wireless communication unit 40, the operating unit 44, the third wireless communication unit 46, and the third power source 48.

The first power source 38 comprises the battery 76, and the fifth housing 122. The battery 76 is connected to the controller 56 of the front derailleur 32 by the first power line 120A. The first power source 38 is electrically connected to the front derailleur 32 via the first power line 120A, and supplies the power to the front derailleur 32.

The battery 76 is connected to the controller 66 of the rear derailleur 34 by a third power line 120C. The first power source 38 supplies power to the rear derailleur 34 via the third power line 120C. The first power source 38 is electrically connected to the second wireless communication unit 40 via the rear derailleur 34, and supplies power to the rear derailleur 34. According to the electrical system 30 of the third embodiment, at least the effects of (1) and (2) of the first embodiment can be achieved.

Fourth Embodiment

Figure 8:
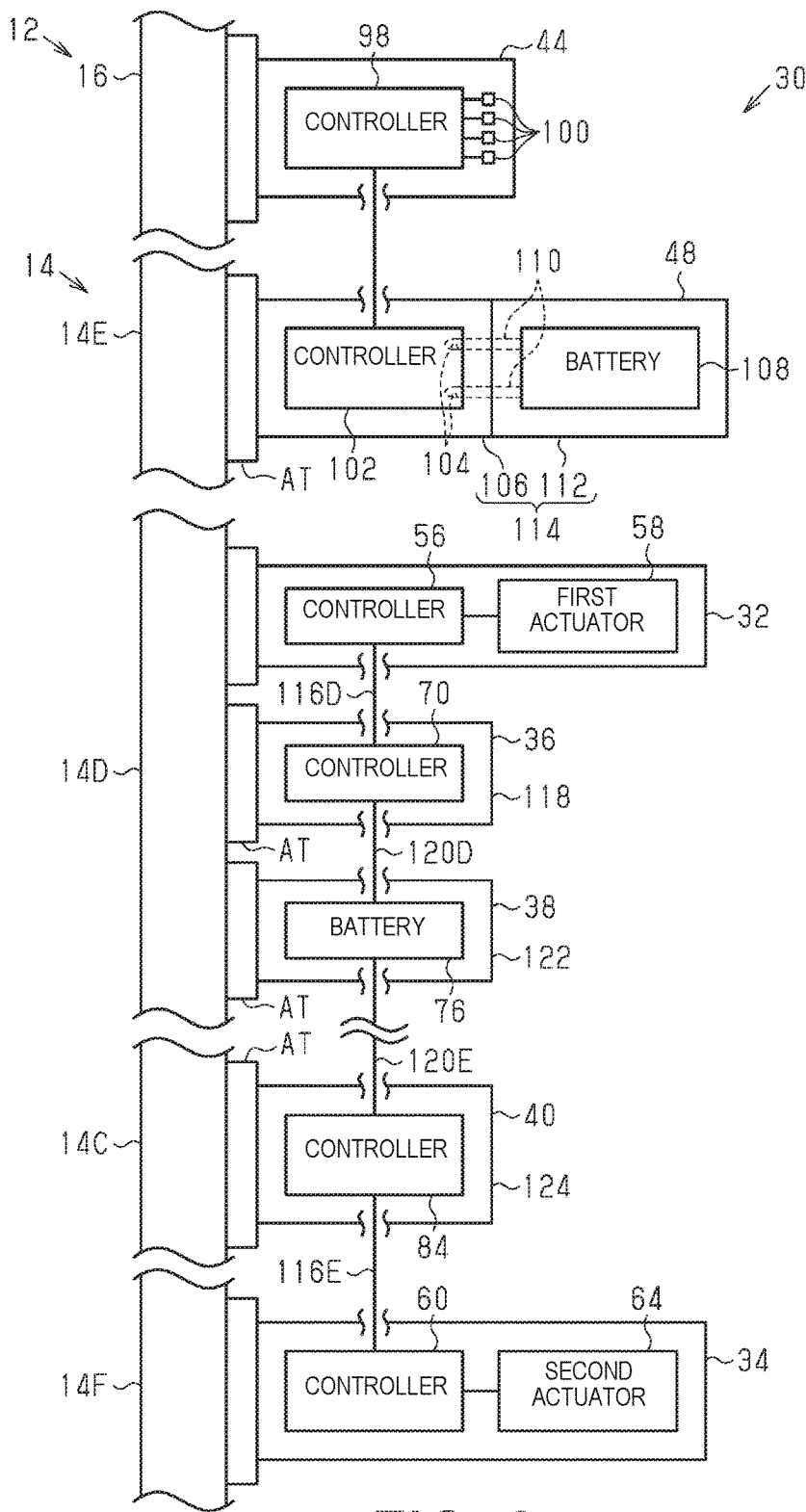
FIG. 8 is a block diagram of the electrical system according to a fourth embodiment.

The electrical system 30 of the fourth embodiment will be described with reference to FIG. 8. The configurations that are common to the third embodiment are given the same reference symbols as the third embodiment, and the descriptions thereof will be omitted.

The electrical system 30 comprises the front derailleur 32, the rear derailleur 34, the first wireless communication unit 36, the first power source 38, the second wireless communication unit 40, the operating unit 44, the third wireless communication unit 46, and the third power source 48.

The first power source 38 comprises the battery 76, and the fifth housing 122. The battery 76 is connected to the controller 70 of the first wireless communication unit 36 by a fourth power line 120D. The first power source 38 supplies power to the front derailleur 32 via the first wireless communication unit 36.

The battery 76 is connected to the controller 84 of the second wireless communication unit 40 by a fifth power line 120E. The first power source 38 supplies power to the rear derailleur 34 via the second wireless communication unit 40. According to the electrical system 30 of the fourth embodiment, at least the effects of (1) and (2) of the first embodiment can be achieved.

Fifth Embodiment

The electrical system 30 of the fifth embodiment will be described with reference to FIGS. 9 and 10. The configurations that are common to the first embodiment are given the same reference symbols as the first embodiment, and the descriptions thereof will be omitted.

Figure 9:
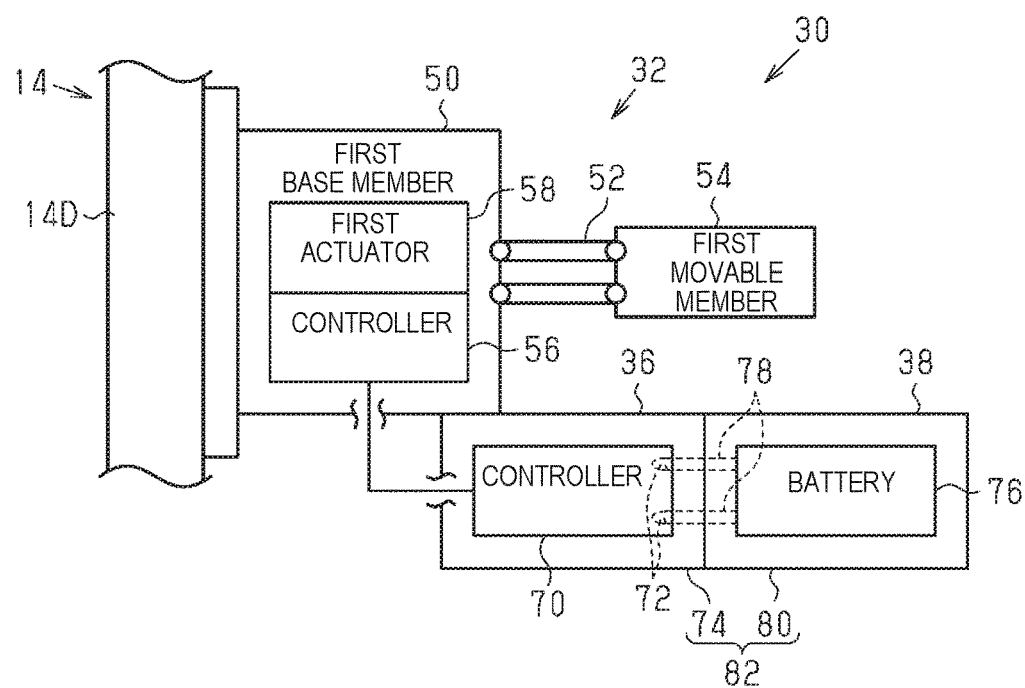
FIG. 9 is a schematic view of the front derailleur according to a fifth embodiment.

As shown in FIG. 9, the first housing 82 is detachably attached to the first base member 50 of the front derailleur 32. The first housing 82 and the first base member 50 are attached, for example, via a bolt or the like. Accordingly, the first wireless communication unit 36 and the first power source 38 can be detachably attached to the first base member 50.

Figure 10:
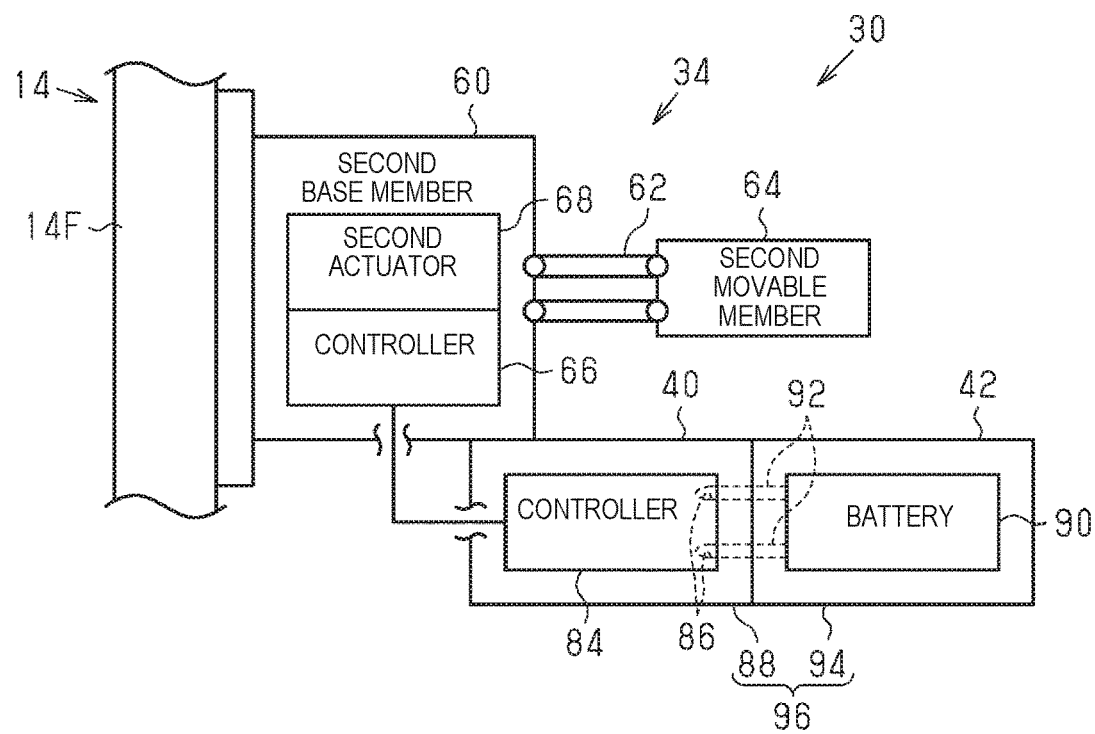
FIG. 10 is a schematic view of the rear derailleur according to the fifth embodiment.

As shown in FIG. 10, the second housing 96 is detachably attached to the second base member 60 of the rear derailleur 34. The second housing 96 and the second base member 60 are attached, for example, via a bolt or the like. Accordingly, the second wireless communication unit 40 and the second power source 42 can be detachably attached to the second base member 60.

The electrical system 30 of the fifth embodiment can achieve the following effects, in addition to the effect of (1) of the first embodiment.

(11) The first wireless communication unit 36 and the first power source 38 are attached to the front derailleur 32. Accordingly, the surrounding of the front derailleur 32 of the frame main body 14 can be less complicated.

(12) The first wireless communication unit 36 and the first power source 38 are detachably attached to the front derailleur 32. Accordingly, it is possible to exchange only one of the front derailleur 32, the first wireless communication unit 36, or the first power source 38, mounted to the bicycle 10.

(13) The first wireless communication unit 36 and the first power source 38 are attached to the first base member 50. Accordingly, a more stable attachment is possible compared to the link member 52 and the first movable member 54.

(14) The second wireless communication unit 40 and the second power source 42 are attached to the rear derailleur 34. Accordingly, the surrounding of the rear derailleur 34 of the frame main body 14 can be less complicated.

(15) The second wireless communication unit 40 and the second power source 42 are detachably attached to the rear derailleur 34. Accordingly, it is possible to exchange only one of the rear derailleur 34, the second wireless communication unit 40, or the second power source 42, mounted to the bicycle 10.

(16) The second wireless communication unit 40 and the second power source 42 are attached to the second base member 60. Accordingly, a more stable attachment is possible compared to the link member 62 and the second movable member 64.

Sixth Embodiment

Figure 11:
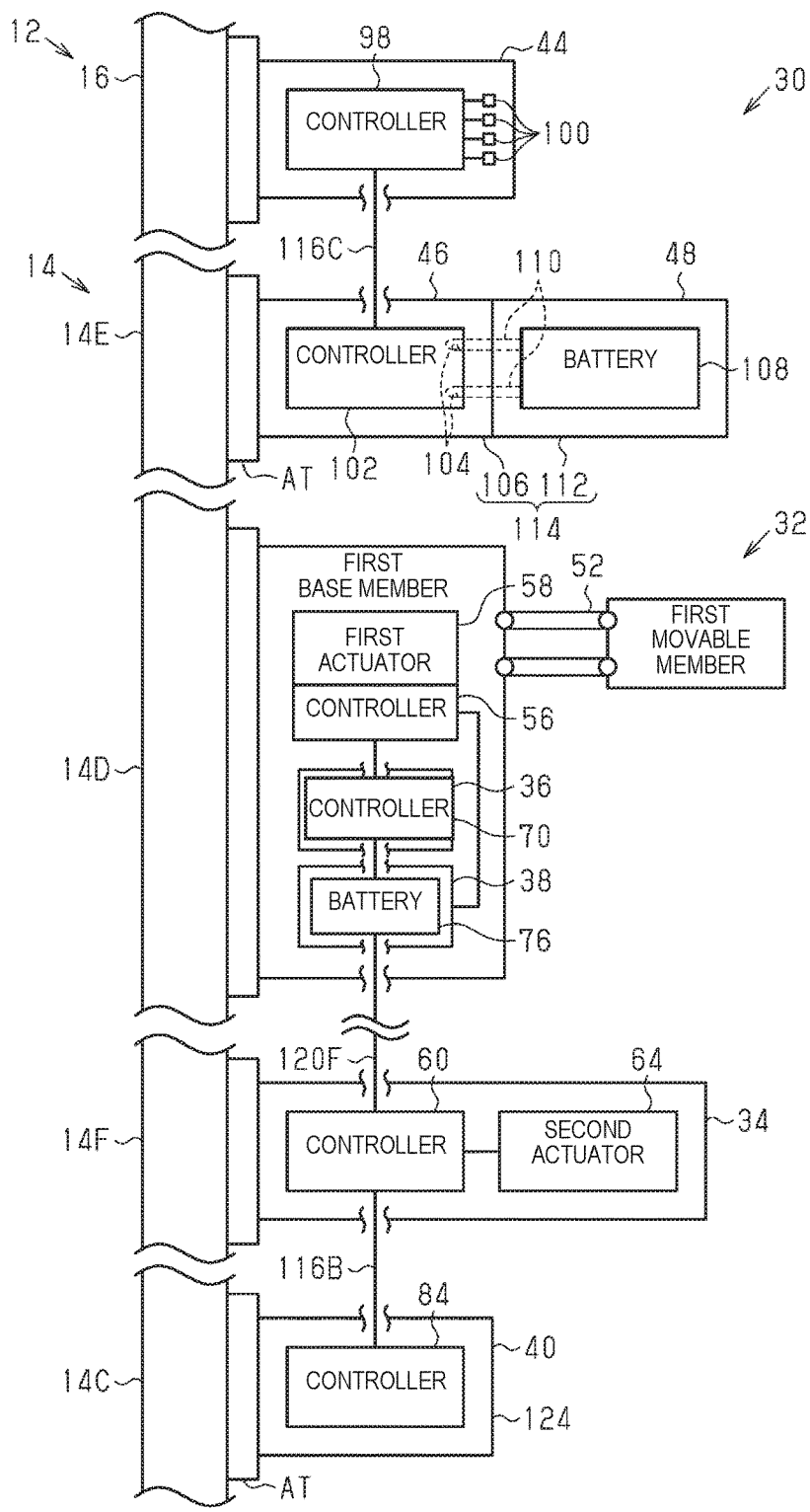
FIG. 11 is a block diagram of the electrical system according to a sixth embodiment.

The electrical system 30 of the sixth embodiment will be described with reference to FIG. 11. The configurations that are common to the first embodiment are given the same reference symbols as the first embodiment, and the descriptions thereof will be omitted.

The electrical system 30 comprises the front derailleur 32, the rear derailleur 34, the first wireless communication unit 36, the first power source 38, the second wireless communication unit 40, the operating unit 44, the third wireless communication unit 46, and the third power source 48.

The first wireless communication unit 36 and the first power source 38 are attached to a first base member 50 of the front derailleur 32. The first wireless communication unit 36 and the first power source 38 are built in to the first base member 50.

The first wireless communication unit 36 is electrically connected to the controller 56 of the front derailleur 32. The first power source 38 is electrically connected to the controller 70 of the first wireless communication unit 36, the controller 56 of the front derailleur 32, and the controller 66 of the rear derailleur 34. The first power source 38 supplies power to the controller 66 of the rear derailleur 34 via a power line 120F. According to the electrical system 30 of the sixth embodiment, at least the effects of (1) of the first embodiment and the effects of (11) and (13) of the sixth embodiment can be achieved.

Seventh Embodiment

The electrical system 30 of the seventh embodiment will be described with reference to FIG. 12-FIG. 14. The configurations that are common to the first embodiment are given the same reference symbols as the first embodiment, and the descriptions thereof will be omitted.

Figure 12:
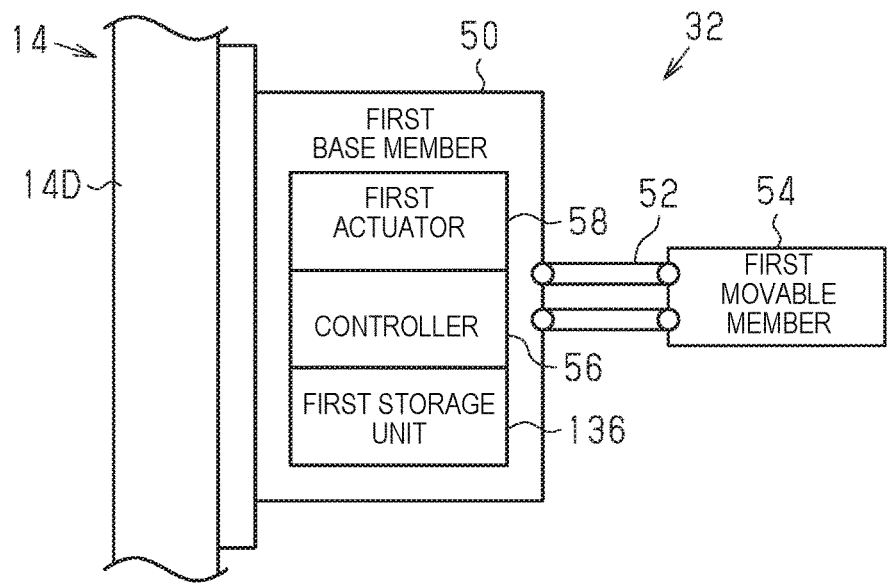
FIG. 12 is a schematic view of the electrical system front derailleur according to the seventh embodiment.

As shown in FIG. 12, the front derailleur 32 comprises a first storage unit 136. Information that is stored in the first storage unit 136 includes identification information, as well as the updatable individual information. The identification information includes the model number and the like of the front derailleur 32. The individual information includes the setting information as well as the history information. The setting information is, for example, the information regarding the adjustment setting of the front derailleur 32. The information regarding the adjustment setting of the front derailleur 32 includes, for example, the location information of the first movable member 54. The location information of the first movable member 54 is stored, for example, as the operation amount of the first actuator 58. The history information includes, for example, the information indicating whether or not the shifting was appropriately carried out, and the information indicating whether or not the communication with the first wireless communication unit 36 has been appropriately carried out. The controller 56 can update the history information each time the shifting and the communication are executed, or, update only when the communication is not appropriately executed.

Figure 13:
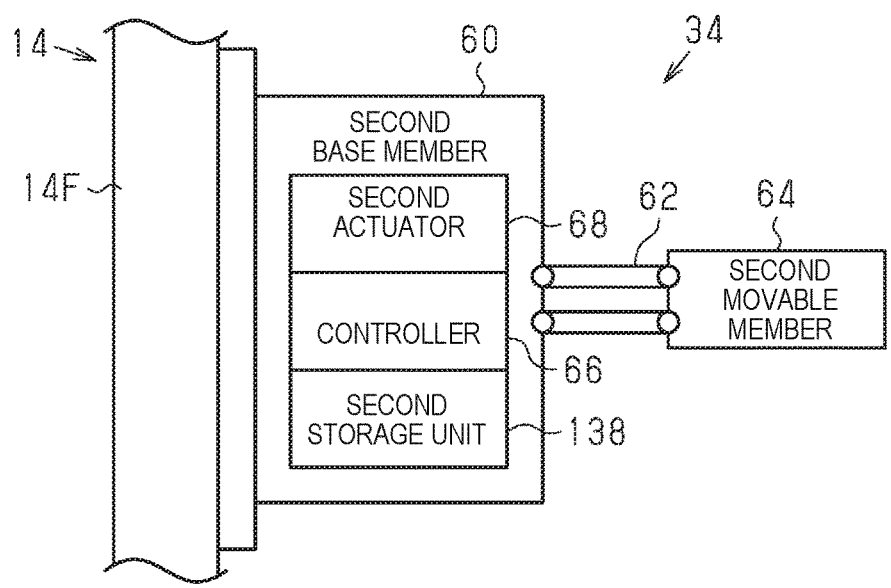
FIG. 13 is a schematic view of the electrical system rear derailleur according to a seventh embodiment.
Figure 14:
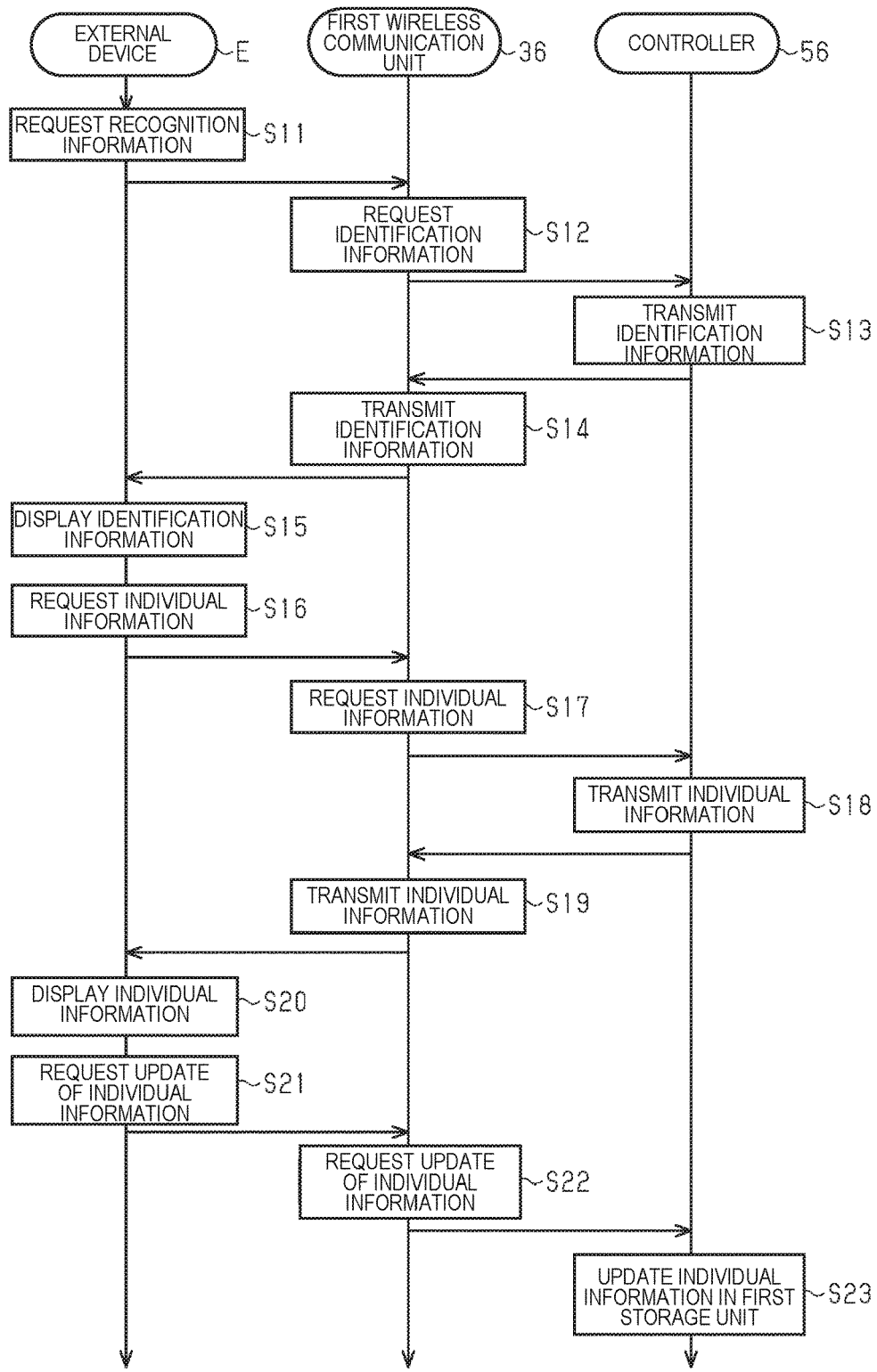
FIG. 14 is a sequence diagram of the update step which is executed by the electrical system according to the seventh embodiment.

As shown in FIG. 13, the rear derailleur 34 comprises a second storage unit 138. The information that is stored in the second storage unit 138 includes the identification information, as well as the updatable individual information. The identification information includes the model number and the like of the rear derailleur 34. The individual information includes the setting information as well as the history information. The setting information is, for example, the information regarding the adjustment setting of the rear derailleur 34. The information regarding the adjustment setting of the rear derailleur 34 includes, for example, the location information of the first movable member 54. The location information of the second movable member 64 is stored, for example, as the operation amount of the second actuator 68. The history information includes, for example, the information indicating whether or not shifting was appropriately carried out, and the information indicating whether or not the communication with the second wireless communication unit 40 has been appropriately carried out. The controller 66 can update the history information each time the shifting and communication are executed, or, update only when the communication is not appropriately executed.

The update steps of the information which is stored in the first storage unit 136 will be described with reference to FIG. 14.

In the update steps, an external device E and the first wireless communication unit 36 are communicably connected. The external device E and the first wireless communication unit 36 are communicably connected by wireless communication. Wireless standards such as Bluetooth (registered trademark), Wi-Fi (registered trademark), ANT+ (registered trademark), and NFC (Near Field Communication) can be employed for the wireless communication. The external device E and the first wireless communication unit 36 can also be communicably connected by a wired communication. The external device E can also directly communicate with the first wireless communication unit 36 or, the external device E and the first wireless communication unit 36 can communicate indirectly via another electric component. An external device E includes various electronic devices, such as a desktop computer, a laptop personal computer, and a smart phone. Examples of other electric components include an operating unit 44, a cycle computer, a battery unit, and other electric components. Examples of the electric component include a drive unit comprising a motor for assisting the human power drive force which is inputted to the bicycle 10, an electric seatpost, and an electric suspension, and the like.

When connected to the first wireless communication unit 36, the external device E requests the identification information from the first wireless communication unit 36, in Step S11. After receiving a signal requesting the identification information (hereinafter referred to as the "identification information request signal"), the first wireless communication unit 36 requests the identification information from the controller 56 in Step S12. After receiving an identification information request signal, the controller 56 reads the identification information stored in the first storage unit 136 and transmits the same to the first wireless communication unit 36, in Step S13. After receiving the identification information, the first wireless communication unit 36 transmits the identification information to the external device E in Step S14.

After receiving the identification information, the external device displays the electric component which corresponds with the received identification information, in a display unit (not shown), in Step S15. Specifically, the model number of the front derailleur 32 is displayed. At this time, when there are a plurality of electric components which can communicate with the first wireless communication unit 36, the external device E can also display a list of electric components that can communicate with the first wireless communication unit 36. Further, when the external device E is also communicable with the second wireless communication unit 40, the external device E can also display a list including electric components that can communicate with the second wireless communication unit 40.

The user selects the front derailleur 32 using an operating unit (not shown), following the contents of the display of the display unit (not shown) of the external device E. The operating unit is, for example, a touch panel or a keyboard provided to the display unit.

When the user selects the front derailleur 32 via the operating unit (not shown), the external device E requests the individual information from the first wireless communication unit 36, in Step S16. After receiving a signal requesting the individual information (hereinafter referred to as the "individual information request signal"), the first wireless communication unit 36 requests the individual information from the controller 56 in Step S17. After receiving an individual information request signal, the controller 56 reads the individual information from the first storage unit 136 and transmits the same to the first wireless communication unit 36, in Step S18. After receiving the individual information, the first wireless communication unit 36 transmits the individual information to the external device E in Step S19.

After receiving the individual information, the external device E displays the received individual information in a display unit (not shown), in Step S20. The user selects the individual information using an operating unit (not shown), following the contents of the display of the display unit (not shown) of the external device E. When the user performs an operation to change the individual information, the external device E transmits a signal to request an update of the individual information (hereinafter referred to as the "individual information update request signal") to the first wireless communication unit 36, in Step S21. The individual information update request signal is, for example, a signal including a request to the effect of changing the first movable member 54 in a first direction or a second direction, in the adjustment setting of the front derailleur 32.

After receiving individual information request signal, the first wireless communication unit 36 transmits the individual information request signal to the controller 56 in Step S22. After receiving the individual information update request signal, the controller 56 updates the individual information that is stored in the first storage unit 136, based on the individual information update request signal, in Step S23. That is, the front derailleur 32 updates the information that is stored in the first storage unit 136 based on the communication with the first wireless communication unit 36. That is, the controller 56 operates the first actuator 58 based on the individual information update request signal, in Step S23. When the individual information update request signal is an adjustment setting of the front derailleur 32, the controller 56 operates the first actuator 58 based on the individual information update request signal. That is, the front derailleur 32 operates the first actuator 58 based on a signal from the first wireless communication unit 36.

After Step S23, the update step is ended, or, at least one step of Steps S11-S23 is executed again, based on the operation of the operating unit (not shown) of the external device E. For example, when the user performs an operation to update another individual information of the front derailleur 32, Step S16-Step S23 are executed again. Further, when the user further updates the individual information updated in Step S23, Step S21-Step S23 are executed again.

The same step as the update step of the information which is stored in the first storage unit 136 is performed regarding the update step of the information stored in the second storage unit 138. For example, when an individual information update request signal is transmitted from the external device E to the second wireless communication unit 40 in accordance with Step S21, the second wireless communication unit 40 which has received the individual information update request signal transmits the individual information update request signal to the controller 66. After receiving individual information update request signal, the controller 66 updates the individual information that is stored in the second storage unit 138, based on the individual information update request signal. The rear derailleur 34 updates the information that is stored in the second storage unit 138 based on the communication with the second wireless communication unit 40.

Further, the controller 66 operates the second actuator 68 based on the individual information update request signal. When the individual information update request signal is an adjustment setting of the rear derailleur 34, the controller 66 operates the second actuator 68 based on the individual information update request signal. That is, the rear derailleur 34 operates the second actuator 68 based on a signal from the second wireless communication unit 40. According to the electrical system 30 of the seventh embodiment, at least effects in accordance with (1) and (2) of the first embodiment can be achieved.

Eighth Embodiment

The electrical system 30 of the eighth embodiment will be described with reference to FIGS. 15 and 16. The configurations that are common to the first embodiment are given the same reference symbols as the first embodiment, and the descriptions thereof will be omitted. In the eighth embodiment, the electric seatpost 134 is an electric component.

Figure 15:
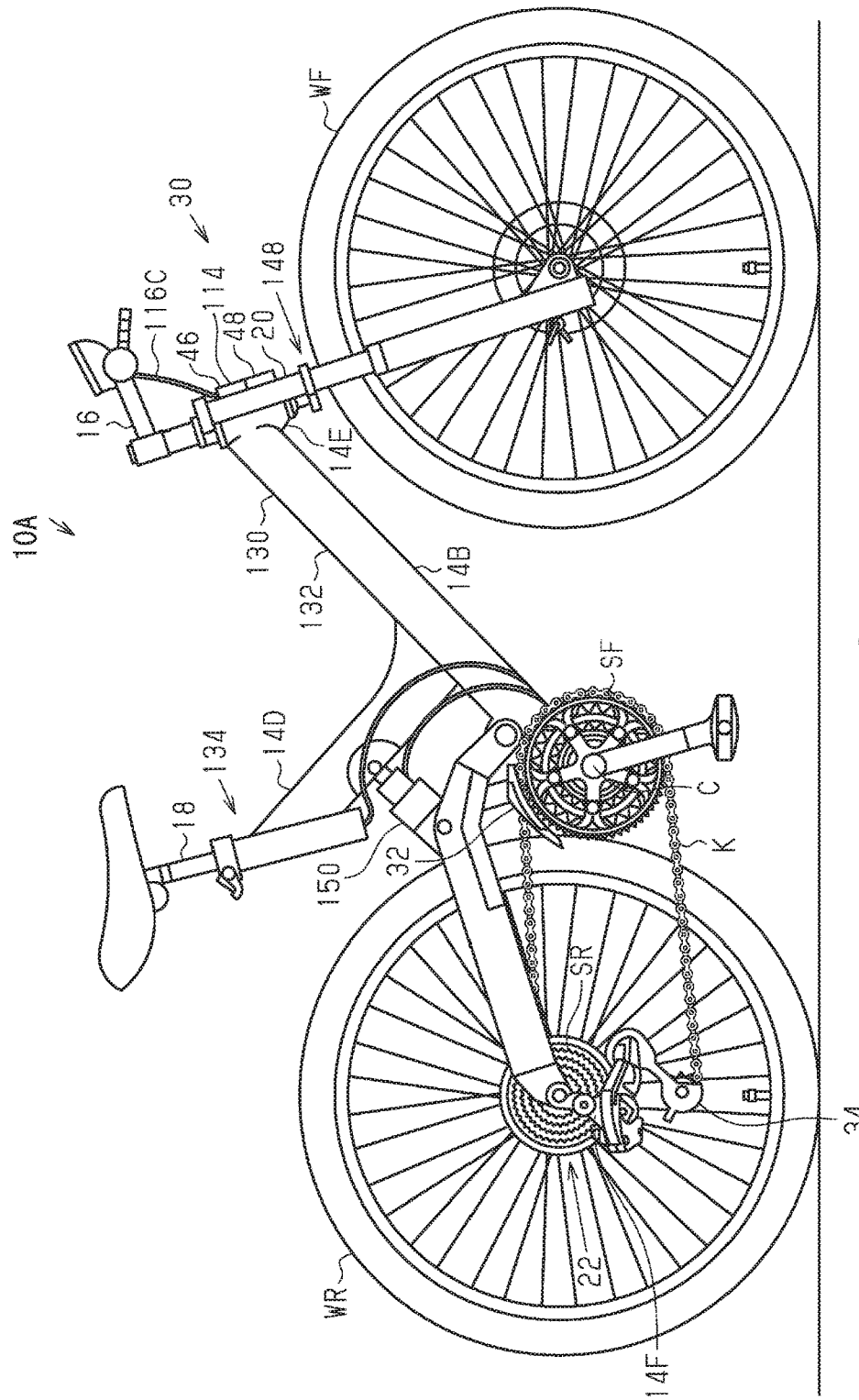
FIG. 15 is a side elevational view of a bicycle equipped with the electrical system of an eighth embodiment.

As shown in FIG. 15, the electrical system 30 is mounted on a bicycle 10A equipped with a vehicle body 130. The vehicle body 130 comprises a frame main body 132, a handlebar 16, a front fork 20, a hub assembly 22, and an electric seatpost 134. The frame main body 132 comprises a down tube 14B, a seat tube 14D, and a head tube 14E.

Figure 16:
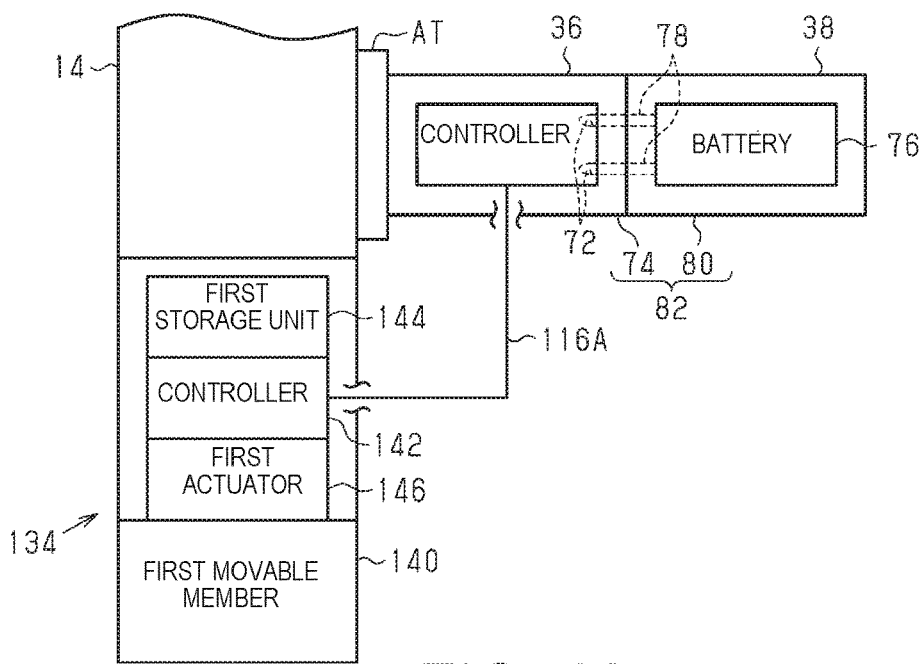
FIG. 16 is a schematic view of the electric seatpost according to the eighth embodiment.

As shown in FIG. 16, the electric seatpost 134 comprises a first movable member 140, a controller 142, a first storage unit 144, and a first actuator 146. The first actuator 146 is, for example, an electric motor. The first movable member 140 is, for example, a pinion of a rack-and-pinion mechanism. The electric seatpost 134 is a first electric component.

The controller 142 is electrically connected to the first wireless communication unit 36. The controller 142 has a processor for performing various calculations and executing various programs. The controller 142 is communicable with the first wireless communication unit 36. The first power source 38 can supply power to the controller 142. At least one of the switches 100 of the operating unit 44 shown in FIG. 5 preferably changes the seat height of the electric seatpost 134. As shown in FIG. 16, the controller 142 changes the seat height of the electric seatpost 134, by operating the first movable member 140. The electric seatpost 134 operates the first actuator 146 based on a signal from the first wireless communication unit 36. When the first actuator 146 is driven, the first movable member 140 is operated and the seat height of the electric seatpost 134 is changed.

Information that is stored in the first storage unit 144 includes the identification information, as well as the updatable individual information. The identification information includes the model number and the like of the electric seatpost 134. The individual information includes the setting information as well as the history information. The setting information is, for example, the seat height of the electric seatpost 134. The history information includes, for example, the information indicating whether or not communication with the first wireless communication unit 36 has been appropriately carried out.

The controller 142 operates the first actuator 146 based on a signal from the first wireless communication unit 36. For example, when an individual information update request signal for changing the seat height is received from the operating unit 44 or an external device E (refer to FIG. 15), the seat height is changed by operating the first actuator 146 based on the received individual information update request signal. According to the electrical system 30 of the eighth embodiment, at least the effects in accordance with (1) and (2) of the first embodiment can be achieved.

Ninth Embodiment

The electrical system 30 of the ninth embodiment will be described with reference to FIGS. 15 and 17. The configurations that are common to the first embodiment are given the same reference symbols as the first embodiment, and the descriptions thereof will be omitted.

The vehicle body 130 further comprises a front suspension device 148 and a rear suspension device 150. The front suspension device 148 is a first electric component.

Figure 17:
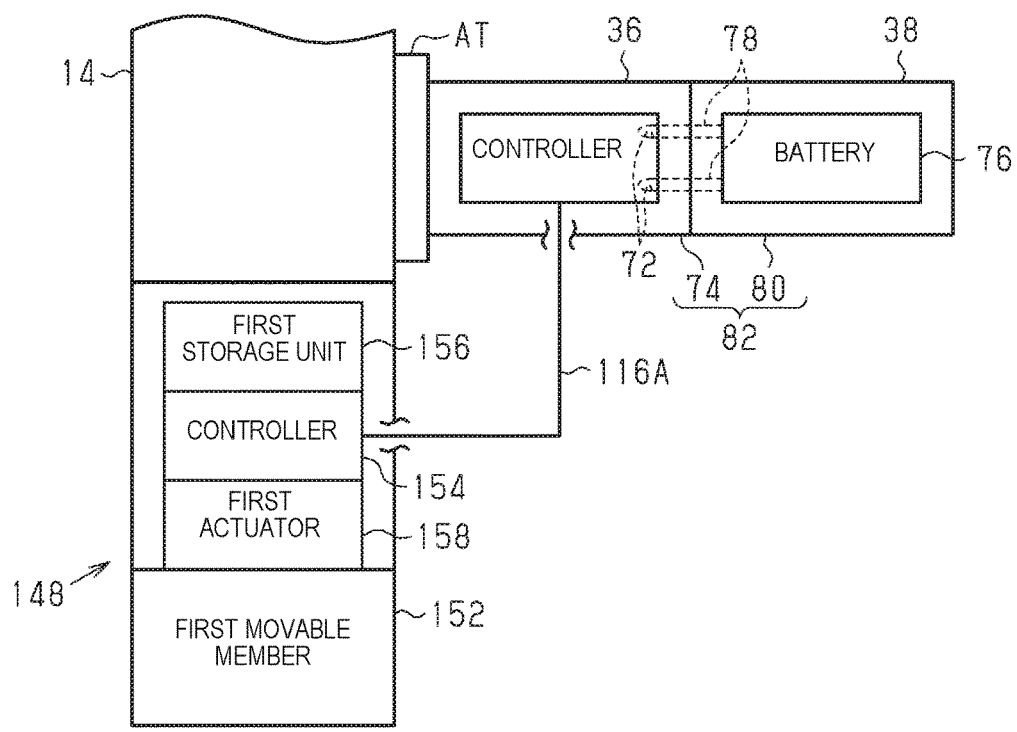
FIG. 17 is a schematic view of the front suspension according to the ninth embodiment.

As shown in the FIG. 17, the front suspension device 148 comprises a first movable member 152, a controller 154, a first storage unit 156, and a first actuator 158. The front suspension device 148 is, for example, a hydraulic device, and the first movable member 152 is, for example, a solenoid valve.

The controller 154 has a processor for performing various calculations and executing various programs. The controller 154 is electrically connected to the first wireless communication unit 36. The controller 154 is communicable with the first wireless communication unit 36. The first power source 38 can supply power to the controller 154. At least one of the switches 100 of the operating unit 44 shown in FIG. 5 preferably controls the front suspension device 148. As shown in FIG. 17, the controller 154 changes the state of the front suspension device 148, by operating the first movable member 152. The front suspension device 148 operates the first actuator 158 based on a signal from the first wireless communication unit 36. When the first actuator 158 is driven, the first movable member 152 is operated and the state of the front suspension device 148 is changed.

Information that is stored in the first storage unit 156 includes the identification information, as well as the updatable individual information. The identification information includes the model number and the like of the front suspension device 148. The individual information includes setting information as well as the history information. The setting information is, for example, the information regarding the state of the front suspension device 148. An example of the state of the front suspension device 148 is the displacement amount of the suspension with respect to the applied load. In a hydraulic front suspension device 148, the state is correlated with the hydraulic pressure. The history information includes, for example, the information indicating whether or not a communication with the first wireless communication unit 36 has been appropriately carried out.

The controller 154 operates the first actuator 158 based on a signal from the first wireless communication unit 36. For example, when an individual information update request signal for changing the state of the front suspension device 148 is received from the operating unit 44 or an external device E (refer to FIG. 15), the state of the front suspension device 148 is changed by operating the first actuator 158 based on the received individual information update request signal. According to the electrical system 30 of the ninth embodiment, at least the effects in accordance with (1) and (2) of the first embodiment can be achieved.

Modified Examples

The description relating to the above-described embodiment is an example of forms that the bicycle electrical system according to the present invention can take, and is not intended to limit the forms thereof. The bicycle electrical system according to the present invention can take the forms of the modified examples of the embodiment shown below, as well as forms that combine at least two modified examples that are not mutually contradictory.

Figure 18:
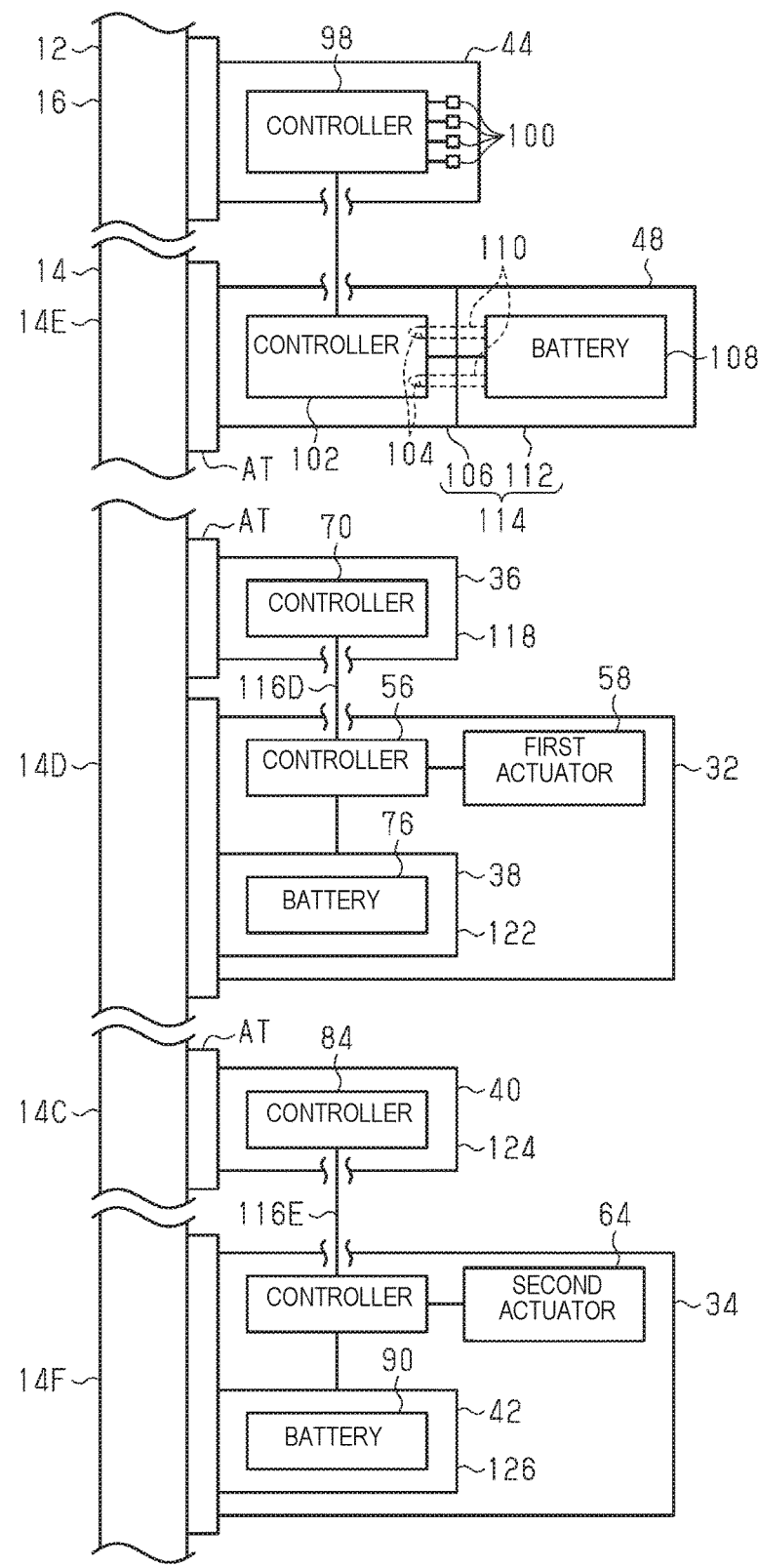
FIG. 18 is a block diagram of the electrical system according to a modified example of the second embodiment.

The first power source 38 of the second embodiment can be attached to the front derailleur 32. For example, as shown in FIG. 18, the first power source 38 can be built into the first base member 50 (refer to FIG. 2) or the first movable member 54 (refer to FIG. 2) of the front derailleur 32. In this case, the fifth housing 122 can be omitted. Further, the first power source 38 can be attached to the outer surface of the front derailleur 32 by a bolt or the like.

The second power source 42 of the second embodiment can be attached to the rear derailleur 34. For example, as shown in FIG. 18, the second power source 42 can be built into the second base member 60 (refer to FIG. 3) or the second movable member 64 (refer to FIG. 3) of the rear derailleur 34. In this case, the sixth housing 124 can be omitted. Further, the second power source 42 can be attached to the outer surface of the rear derailleur 34 by a bolt or the like.

Figure 19:
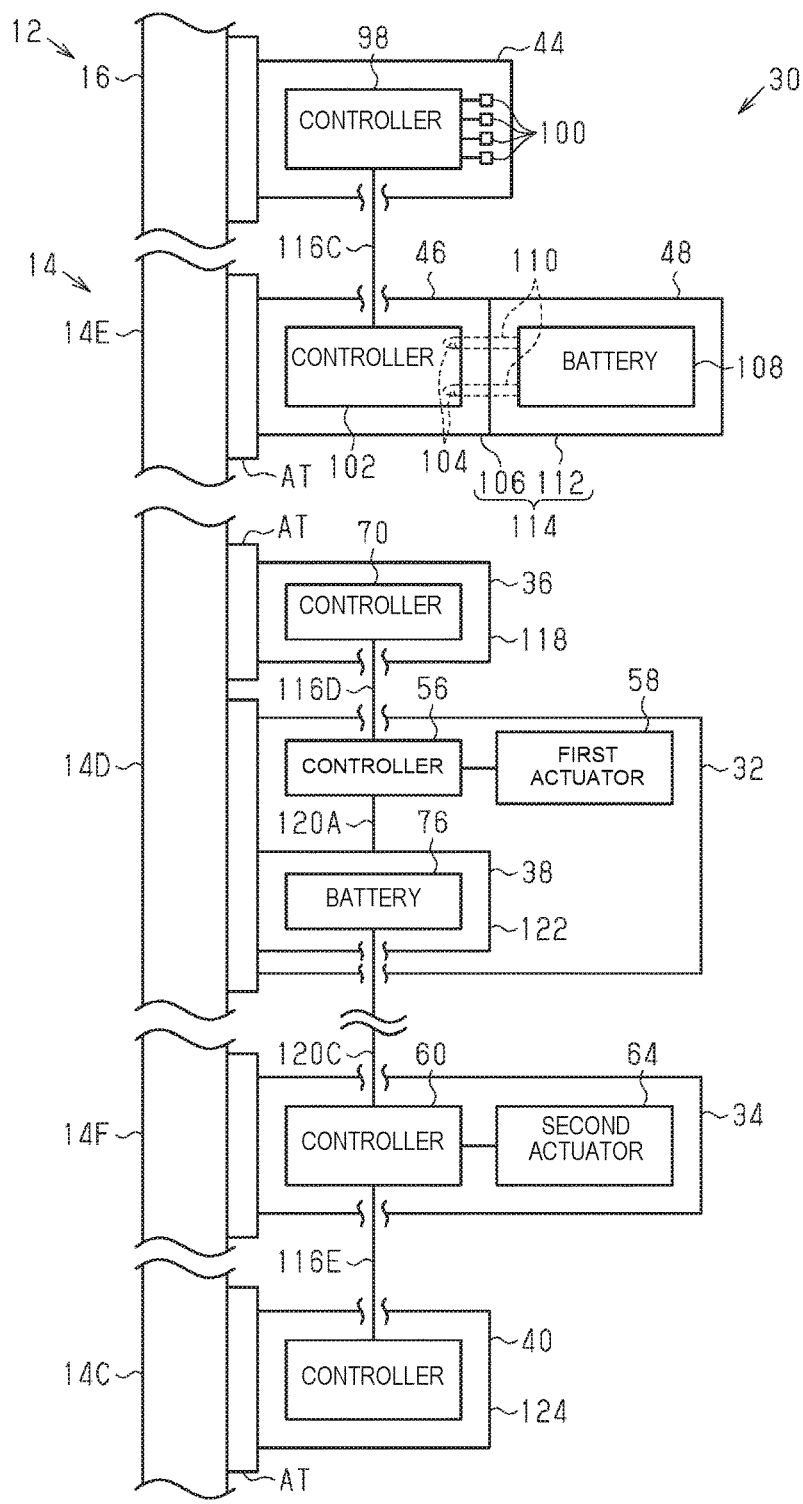
FIG. 19 is a block diagram of the electrical system according to a modified example of the third embodiment.

The first power source 38 of the third embodiment can be attached to the front derailleur 32. For example, as shown in FIG. 19, the first power source 38 can be built into the first base member 50 (refer to FIG. 2) or the first movable member 54 (refer to FIG. 2) of the front derailleur 32. In this case, the fifth housing 122 can be omitted. Further, the first power source 38 can be attached to the outer surface of the front derailleur 32 by a bolt or the like.

Figure 20:
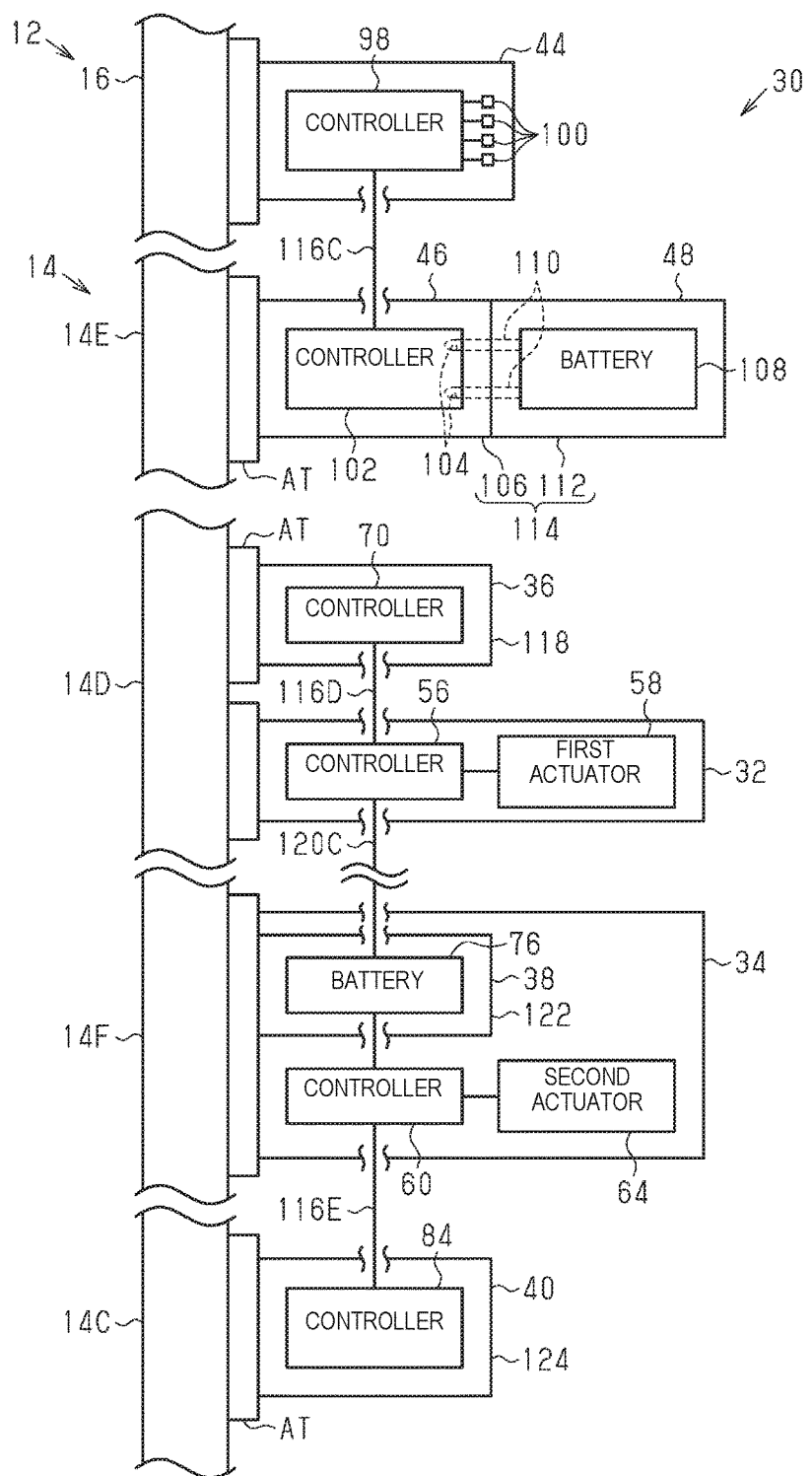
FIG. 20 is a block diagram of the electrical system according to a modified example of the third embodiment.

The first power source 38 of the third embodiment can be attached to the rear derailleur 34. For example, as shown in FIG. 20, the first power source 38 can be built into the second base member 60 (refer to FIG. 3) or the second movable member 64 (refer to FIG. 3) of the rear derailleur 34. In this case, the fifth housing 122 can be omitted. Further, the first power source 38 can be attached to the outer surface of the rear derailleur 34 by a bolt or the like.

In the fifth embodiment, the second housing 96 can be fixed to the rear derailleur 34. That is, the second wireless communication unit 40 can be non-detachably attached to the rear derailleur 34. Further, the second wireless communication unit 40 can be non-detachably attached to the second base member 60. Further, the second power source 42 can be non-detachably attached to the second base member 60. In the case that the rear derailleur 34 is configured as the first electric component and the front derailleur 32 is configured as the second electric component, the first housing can be made detachable to the rear derailleur 34 and the second housing can be fixed to the front derailleur 32.

In the seventh embodiment, the shift sequence as the individual information can be stored to the first storage unit 136 and the second storage unit 138. When receiving a signal to change the gear ratio γ from the operating unit 44, at least one of the first actuator 58 and the second actuator 68 is operated on the basis of the shift sequence by the controller 56 and the controller 66. The shift sequence preferably includes a first sequence in which the gear ratio of the bicycle 10 which is determined by both the front derailleur 32 and the rear derailleur 34 becomes larger, and a second sequence in which the gear ratio of the bicycle 10 which is determined by both the front derailleur 32 and the rear derailleur 34 becomes gradually smaller. When receiving a signal for increasing the gear ratio of the bicycle 10 from the operating unit 44, the controller 56 and the controller 66 determine whether or not to operate the first actuator 58 and the second actuator 68 according to the first sequence. When receiving a signal for decreasing the gear ratio of the bicycle 10 from the operating unit 44, the controller 56 and the controller 66 determine whether or not to operate the first actuator 58 and the second actuator 68 according to the second sequence. In this modified example, the front derailleur 32 and the rear derailleur 34 operate the actuators 58 and 68 based on a communication with the wireless communication units 36 and 40.

In the modified example described above, the shift sequence which is stored in the first storage unit 136 can be updated using an external device E via the first wireless communication unit 36. Further, the shift sequence which is stored in the second storage unit 138 can be updated using an external device E via the second wireless communication unit 40. In this modified example, the front derailleur 32 and the rear derailleur 34 update the information stored in the storage units 136 and 138, based on a communication with the wireless communication units 36 and 40.

In the seventh embodiment, a setting information of a permission to continuously shift as the individual information can be stored to the first storage unit 136 and the second storage unit 138. A setting information of a permission to continuously shift is a setting for permitting or not permitting a shifting of a plurality of stages, based on the time that the switch 100 is pressed. The electrical system 30 is capable of updating the setting information of a permission to continuously shift, which is stored in the storage units 136 and 138 from the external device E via the wireless communication units 36 and 40, to be permitted or not permitted.

In the seventh embodiment, a shifting prohibited period as the individual information can be stored to the first storage unit 136 and the second storage unit 138. The shifting prohibited period is a period during which a shifting operation is prohibited after a shifting operation is executed. The electrical system 30 is capable of updating the shifting prohibited period which is stored in the storage units 136 and 138 from the external device E via the wireless communication units 36 and 40.

In the seventh embodiment, a shift position restriction information as the individual information can be stored to the first storage unit 136 and the second storage unit 138. The shift position restriction information comprises at least one of the upper limit and the lower limit of the shift position. The electrical system 30 automatically controls the front derailleur 32 and the rear derailleur 34 based on the shift position restriction information. The period during which the front derailleur 32 and the rear derailleur 34 are controlled by the electrical system 30 can be limited to when the running of the bicycle 10 has been started. The electrical system 30 is capable of updating the shift position restriction information which is stored in the storage units 136 and 138 from the external device E via the wireless communication units 36 and 40.

In the seventh embodiment, a cycle computer comprising a controller and a storage unit can be electrically connected to the first wireless communication unit 36 or the second wireless communication unit 40. For example, the setting information to turn a beep sound ON or OFF is stored as the individual information to the storage unit of the cycle computer. Further, for example, the setting information of the display time on the display unit of the cycle computer is stored as the individual information to the storage unit of the cycle computer. The display time is the time during which the various information is displayed on the display unit when the operating unit of the cycle computer is not operated. The controller of the cycle computer updates information stored in the storage unit of the cycle computer, based on the received individual information update request from the external device E via the first wireless communication unit 36 or the second wireless communication unit 40.

In the seventh embodiment, Steps S16-S19 can be omitted. In this case, the external device E reads individual information corresponding to the identification information received from the Internet or the like, or the storage unit of the external device E in Step S20, and displays the read individual information on the display unit.

In the seventh embodiment, Steps S11-S14 and Steps S16-S19 can be executed at the same time. For example, when receiving an individual information request signal from the external device E, the first wireless communication unit 36 and the controller 56 transmit individual information along with the identification information to the external device E. The external device E displays the received individual information on the display unit based on an operation of the operating unit.

In the seventh embodiment, the drive unit can be configured as the first electric component. The drive unit comprises a first actuator for assisting a human power drive force that is inputted to the bicycle 10, a first controller, and a first storage unit. The first actuator is, for example, an electric motor. That is, the drive unit comprises a motor for assisting the human power drive force that is inputted to a crank. The drive unit operates the first actuator based on a signal from the first wireless communication unit 36. For example, when a signal to turn the first actuator ON or to increase or decrease the drive force of the first actuator is inputted from the operating unit 44, the controller 56 stops the drive or changes the torque of the first actuator, based on the signal.

In the above-described modified example, the setting information of the start mode as the individual information can be stored to the first storage unit 136. A setting information of the start mode is a setting for whether or not to drive the first actuator when the bicycle 10 starts running. Alternatively, a setting information is a setting for whether or not to permit controlling the shift position to a prescribed position when the bicycle 10 starts running. The electrical system 30 is capable of updating the setting information of a permission to continuously shift, which is stored in the storage unit 136 from the external device E via the wireless communication unit 36, to be permitted or not permitted.

The electrical system 30 comprising the drive unit described above can perform a setting for whether or not a light is connected to the bicycle 10, using the external device E and the first wireless communication unit 36.

In the eighth embodiment, the electric seatpost 134 can be configured as the second electric component.

In the ninth embodiment, a rear suspension device 150 can be employed instead of the front suspension device 148. Further, a rear suspension device 150 can be employed as a second electric component. Further, a rear suspension device 150 can be configured as a first electric component and a front suspension device 148 can be configured as a second electric component. Furthermore, a suspension device comprising a front suspension device 148 and a rear suspension device 150 can be configured as a first electric component.

In each of the embodiments, the operating unit 44 can be provided with a storage unit. The setting information for defining the relationships between each switch 100 and the types of derailleurs 32 and 34 as well as the shift operation is stored in the storage unit of the operating unit 44 as the individual information. The controller 56 of the operating unit 44 updates the information stored in the storage unit of the operating unit 44, based on the received individual information update request from the external device E via the third wireless communication unit 46.

In the seventh to the ninth embodiments, the first electric component and the second electric component can transmit the number of errors to the external device E as the history information, based on a signal from the wireless communication units 36 and 40. Further, instead of the number of errors, the number of operations of the electric component can be read as the history information.

In the ninth embodiment, the setting information for defining the relationships between each switch 100 and the type of the front suspension device 148 as well as the individual information can be stored in the storage unit of the operating unit 44 as the individual information. An example of the setting information is a setting information of the mode. The mode sets the control mode of the front suspension device 148. The control modes include, for example, a fork mode, a shock mode, an uphill mode, a trail mode, and a downhill mode.

Figure 21:
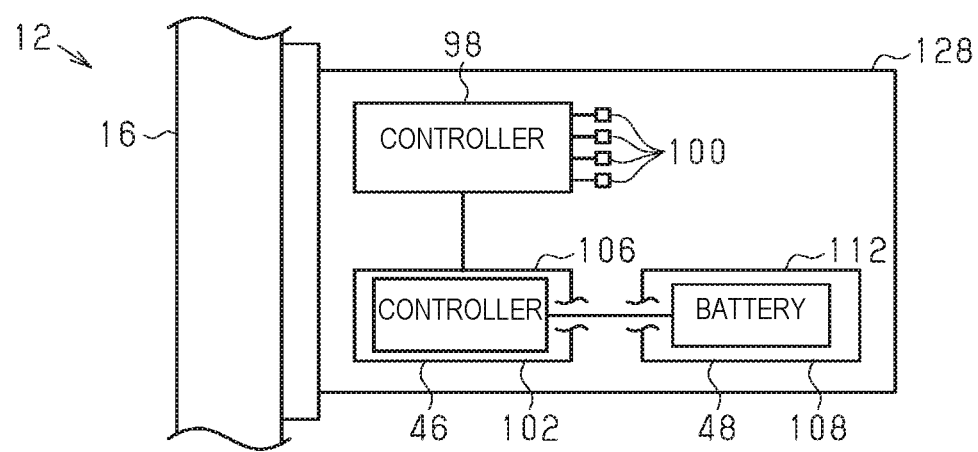
FIG. 21 is a block diagram of the electrical system according to a modified example of the first embodiment.

In each embodiment, the operating unit 44 can be changed to the operating unit 128 shown in FIG. 21. The operating unit 128 incorporates a third wireless communication unit 46 and a third power source 48. The third wireless communication unit 46 and the third power source 48 are attached to the handlebar 16 via the operating unit 44. In this case, the fifth housing portion 106 and the sixth housing portion 112 can be omitted.

In each embodiment, the controller 98 of the operating unit 44 can be omitted. In this case, each of the switches 100 and the controller 102 of the third wireless communication unit 46 are connected by a communication line. Then, when a switch 100 is operated, the controller 102 of the third wireless communication unit 46 transmits a shift signal wirelessly to at least one of the first wireless communication unit 36 and the second wireless communication unit 40, based on the operated switch 100.

The third power source 48 can be permitted as well. In this case, a configuration can be employed in which power is supplied to the controller 98 along with an operation of the switch 100 by including a piezoelectric element in the switch 100. The controller 98 transmits an operation signal to the controller 102, based on the supply of power due to the switch 100 being operated.

In each embodiment, a plurality of the operating units 44 can be employed as well. In this case, one operating unit 44 can be associated with the front derailleur 32 and the other operating units 44 can be associated with the rear derailleur 34. In this case, one third wireless communication unit 46 and one third power source 48 which are connected to the plurality of operating units 44 can be provided, or a third wireless communication unit 46 and a third power source 48 can be provided for each operating unit 44.

The first housing 82 of the first embodiment can be attached to the chain stay 14C, the seatpost 18, the front fork 20, or the hub assembly 22. In addition, at least one of the fourth housing 118 and the fifth housing 122 of the second embodiment to the fourth embodiment as well as the sixth embodiments can be attached to the chain stay 14C, the seatpost 18, the front fork 20, or the hub assembly 22.

The second housing 96 of the first embodiment can be attached to the seat tube 14D, the seatpost 18, the front fork 20, or the hub assembly 22. In addition, at least one of the sixth housing 124 and the seventh housing 126 of the second to the fourth as well as the sixth embodiments can be attached to the chain stay 14C, the seatpost 18, the front fork 20, or the hub assembly 22.

Figure 22:
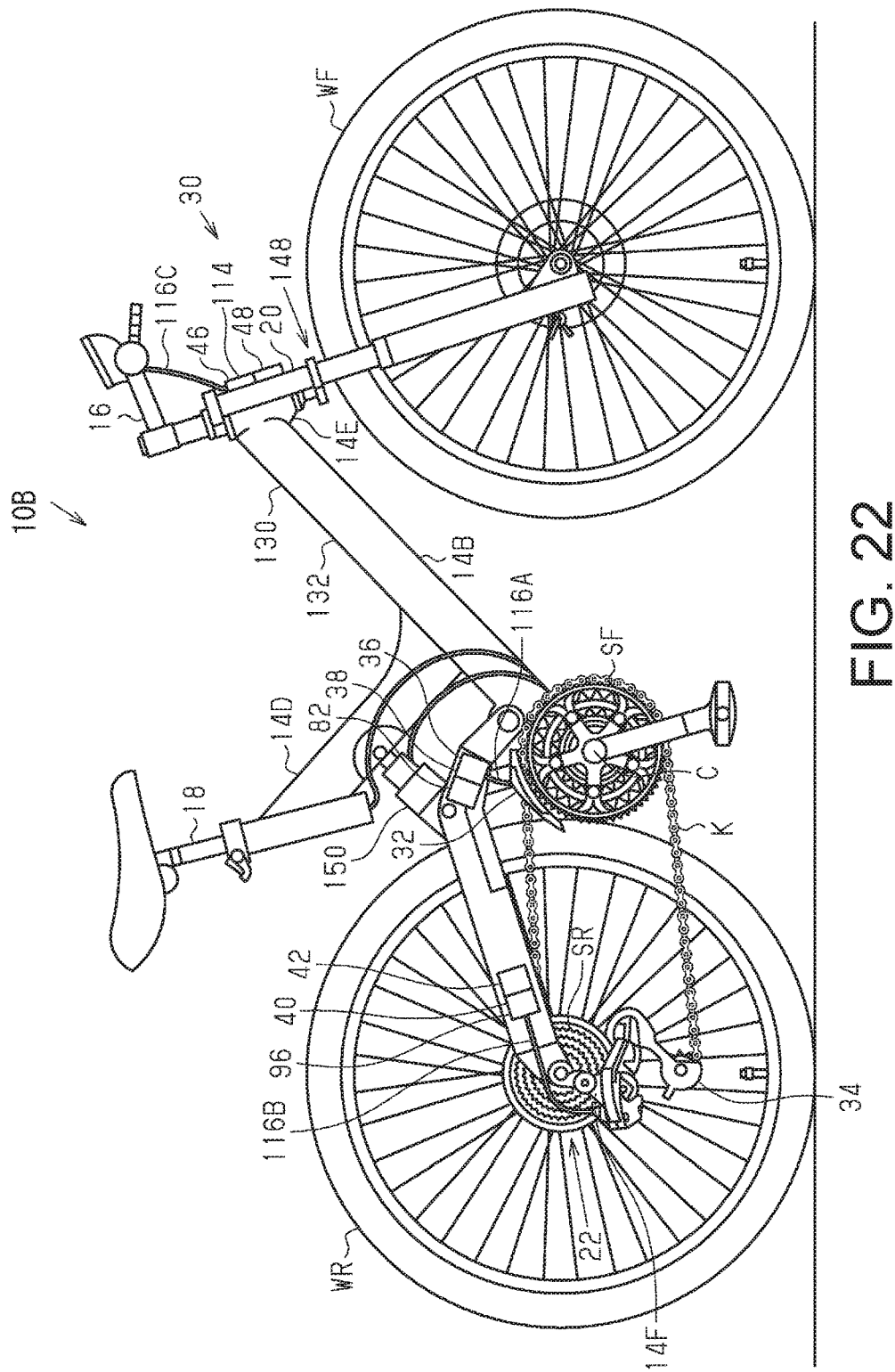
FIG. 22 is a side elevational view of a bicycle equipped with the electrical system of a modified example of the first embodiment.

The electrical system 30 of the first to the seventh embodiments can be mounted to a bicycle 10B comprising the vehicle body 130 shown in FIG. 22. The vehicle body 130 comprises the frame main body 132, the handlebar 16, the seatpost 18, the front fork 20 comprising the front suspension device 148, the hub assembly 22, and rear suspension device 150. The frame main body 132 comprises the down tube 14B, the seat tube 14D, and the head tube 14E. In this case, the first housing 82 can be attached to the front suspension device 148 or the rear suspension device 150. Further, the second housing 96 can be attached to the front suspension device 148 or the rear suspension device 150.

In each embodiment, the first wireless communication unit 36 can be electrically connected to the rear derailleur 34, and the second wireless communication unit 40 can be electrically connected to the front derailleur 32. In this case, the rear derailleur 34 corresponds to a first electric transmission and the front derailleur 32 corresponds to a second electric transmission.

In each embodiment, the front derailleur 32 can be changed to an electric transmission that is built into a support portion 14A. For example, the electric transmission can be configured by a planetary gear mechanism comprising a plurality of sun gears and comprising a regulating mechanism for selecting and regulating the rotation of the plurality of sun gears. In this case, in the seventh embodiment, the adjustment setting of the front derailleur 32 is performed by adjusting the operation amount of the regulating mechanism.

In each embodiment, the rear derailleur 34 can be changed to an electric transmission that is built into the hub assembly 22. For example, the electric transmission can be configured by a planetary gear mechanism comprising a plurality of sun gears and comprising a regulating mechanism for selecting and regulating the rotation of the plurality of sun gears. In this case, in the seventh embodiment, the adjustment setting of the rear derailleur 34 is performed by adjusting the operation amount of the regulating mechanism.

In each embodiment, the electrical system 30 can be applied to a bicycle 10 comprising a motor for assisting a human power drive force that is inputted to a crankshaft C.

What is claimed is:

1. A bicycle electrical system comprising:
   a first electric component;
   a second electric component, the first and second electric components each having a mounting part that is configured to be mounted to a bicycle;
   a first wireless communication unit;
   a first power source; and
   a second wireless communication unit;
   the first wireless communication unit and the first power source being electrically connected to at least the first electric component,
   the second wireless communication unit being electrically connected to at least the second electric component,
   the first electric component configured to communicate with the first wireless communication unit,
   the second electric component configured to communicate with the second wireless communication unit, and
   at least the first wireless communication unit and the second wireless communication unit having another mounting part that is configured to be attached to the bicycle.

2. The bicycle electrical system as recited in claim 1, wherein
   the first wireless communication unit is electrically connected to the first electric component via a first signal line, and
   the second wireless communication unit is electrically connected to the second electric component via a second signal line.

3. The bicycle electrical system as recited in claim 1, wherein
   the first power source is configured to be attached to the bicycle without interposing the first electric component and the second electric component.

4. The bicycle electrical system as recited in claim 3, wherein
   the first power source, the first wireless communication unit, and the second wireless communication unit are configured to be attached to different positions of the bicycle.

5. The bicycle electrical system as recited in the claim 3, wherein
   the first power source as well as the first wireless communication unit, and the second wireless communication unit are configured to be attached to different positions of the bicycle.

6. The bicycle electrical system as recited in claim 1, wherein
   the first power source is attached to the first electric component or the second electric component.

7. The bicycle electrical system as recited in claim 6, wherein
   the first power source is attached to the first electric component, and
   the first power source is electrically connected to the second electric component.

8. The bicycle electrical system as recited in claim 1, further comprising
   a second power source that is electrically connected to at least the second electric component.

9. The bicycle electrical system as recited in claim 8, wherein the second power source is configured to be attached to the bicycle without interposing the first electric component and the second electric component.

10. The bicycle electrical system as recited in claim 9, wherein
    the first power source, the second power source, the first wireless communication unit, and the second wireless communication unit are configured to be attached to different positions of the bicycle.

11. The bicycle electrical system as recited in claim 9, wherein
    the first power source as well as the first wireless communication unit, and the second power source as well as the second wireless communication unit are configured to be attached to different positions of the bicycle.

12. The bicycle electrical system as recited in claim 8, wherein
    the second power source is attached to the first electric component or the second electric component.

13. The bicycle electrical system as recited in claim 5, comprising:
    a first housing that houses at least a part of at least the first wireless communication unit and at least a part of the first power source; and
    a second housing that houses at least a part of at least the second wireless communication unit;
    the first housing and the second housing being configured to be attached to the bicycle without interposing the first electric component and the second electric component.

14. The bicycle electrical system as recited in claim 13, wherein
    the first wireless communication unit comprises a first connecting part and a first housing portion,
    the first power source comprises a second connecting part and a second housing portion, and
    the first connecting part and the second connecting part are joined to supply power from the first power source to the first wireless communication unit, and the first housing includes the first housing portion and the second housing portion.

15. The bicycle electrical system as recited in claim 14, further comprising
    a second power source electrically connected to at least the second electric component, and
    the second housing houses at least the second wireless communication unit and the second power source.

16. The bicycle electrical system as recited in claim 15, wherein
    the second wireless communication unit comprises a third connecting part and a third housing portion,
    the second power source comprises a fourth connecting part and a fourth housing portion, and
    the third connecting part and the fourth connecting part are joined to supply power from the second power source to the second wireless communication unit, and the second housing includes the third housing portion and the fourth housing portion.

17. The bicycle electrical system as recited in claim 13, wherein
    the first housing and the second housing have substantially the same shape.

18. The bicycle electrical system as recited in claim 13, wherein
    at least one of the first housing and the second housing is configured to be attached to a frame main body of the bicycle.

19. The bicycle electrical system as recited in claim 18, wherein
at least one of the first housing and the second housing is configured to be attached to a chain stay of the bicycle.

20. The bicycle electrical system as recited in claim 18, wherein
at least one of the first housing and the second housing is configured to be attached to a seat tube of the bicycle.

21. The bicycle electrical system as recited in claim 13, wherein
at least one of the first housing and the second housing is configured to be attached to a seatpost of the bicycle.

22. The bicycle electrical system as recited in claim 13, wherein
at least one of the first housing and the second housing is configured to be attached to a front fork of the bicycle.

23. The bicycle electrical system as recited in claim 13, wherein
at least one of the first housing and the second housing is configured to be attached to a hub assembly of the bicycle.

24. The bicycle electrical system as recited in claim 13, wherein
at least one of the first housing and the second housing is configured to be attached to a suspension device of the bicycle.

25. The bicycle electrical system as recited in claim 13, wherein
the first housing and the second housing are configured to be detachably attached to the bicycle.

26. The bicycle electrical system as recited in claim 13, wherein
the first housing and the second housing are configured to be attached to the bicycle by an attaching member.

27. The bicycle electrical system as recited in claim 26, wherein
the attaching member comprises at least one of an adhesive, a screw, a cable tie, or a double-sided tape.

28. A bicycle electrical system comprising:
a first electric component; and
a first wireless communication unit,
the first wireless communication unit being electrically connected to the first electric component,
the first electric component being communicable with the first wireless communication unit, and
the first wireless communication unit being configured to be detachably attached to the first electric component.

29. The bicycle electrical system as recited in claim 28, wherein
the first electric component comprises a first base member that is configured to be attached to the bicycle, and
the first wireless communication unit is configured to be detachably attached to the first base member.

30. The bicycle electrical system as recited in claim 28, further comprising
a first power source attached to the first electric component.

31. The bicycle electrical system as recited in claim 30, wherein
the first electric component comprises a first base member that is configured to be attached to the bicycle, and
the first power source is configured to be detachably attached to the first base member.

32. The bicycle electrical system as recited in claim 28, wherein
the first wireless communication unit is electrically connected to the first electric component via a first signal line.

33. The bicycle electrical system as recited in claim 28, further comprising
a second electric component; and
a second wireless communication unit that is electrically connected to the second electric component,
the second electric component being configured to communicate with the second wireless communication unit, and
the second wireless communication unit being configured to be detachably attached to the second electric component.

34. The bicycle electrical system as recited in claim 33, wherein
the second electric component comprises a second base member that is configured to be attached to the bicycle, and
the second wireless communication unit is configured to be detachably attached to the second base member.

35. The bicycle electrical system as recited in claim 33, comprising
a second power source that is attached to the second electric component.

36. The bicycle electrical system as recited in claim 35, wherein
the second electric component comprises a second base member that can be attached to the bicycle, and
the second power source is detachably attached to the second base member.

37. The bicycle electrical system as recited in claim 33, wherein
the second wireless communication unit is electrically connected to the second electric component via a second signal line.

38. A bicycle electrical system comprising:
a first electric component;
a second electric component, the first and second electric components each having a mounting part that is configured to be mounted to a bicycle;
a first wireless communication unit;
a first power source; and
a second wireless communication unit;
the first wireless communication unit and the first power source being electrically connected to at least the first electric component,
the second wireless communication unit being electrically connected to at least the second electric component,
the first electric component being configured to communicate with the first wireless communication unit,
the second electric component configured to communicate with the second wireless communication unit,
the first wireless communication unit and the first power source are attached to the first electric component, and
the second wireless communication unit having another mounting part that is configured to be directly attached to the bicycle.

39. The bicycle electrical system as recited in claim 38, further comprising:
an operating unit, and
a third wireless communication unit which transmits a gear changing signal wirelessly to at least one of the first wireless communication unit and the second wireless communication unit, the third wireless communication unit being configured to be attached to the bicycle without interposing the first electric component and the second electric component.

40. The bicycle electrical system as recited in claim 39, comprising
a third power source that is electrically connected to at least the operating unit.

41. The bicycle electrical system as recited in claim 40, further comprising
a third housing that houses at least a part of the third wireless communication unit and at least a part of the third power source, and the third housing being configured to be attached to the bicycle without interposing the first electric component and the second electric component.

42. The bicycle electrical system as recited in claim 41, wherein
the first housing, the second housing, and the third housing are substantially the same shape.

43. The bicycle electrical system as recited in claim 1, wherein
the second electric component comprises a second actuator that is operated based on a signal from the second wireless communication unit.

44. The bicycle electrical system as recited in claims 1, wherein
the first electric component comprises a first actuator that is operated based on a signal from the first wireless communication unit.

45. The bicycle electrical system as recited in claim 1, wherein
the second electric component comprises a second storage unit, and information stored in the second storage unit is updated based on a communication with the second wireless communication unit.

46. The bicycle electrical system as recited in claim 1, wherein
the first electric component comprises a first storage unit, and information stored in the first storage unit is updated based on a communication with the first wireless communication unit.

47. The bicycle electrical system as recited in of claim 1, wherein
at least one of the first and the second electric components is an electric transmission.

48. The bicycle electrical system as recited in claim 47, wherein
one of the first and the second electric component is an electric front derailleur, and
the other of the first and the second electric components is an electric rear derailleur.

49. The bicycle electrical system as recited in claim 1, wherein
at least one of the first and the second electric components is an electric seatpost.

50. The bicycle electrical system as recited in claim 1, wherein
at least one of the first and the second electric components is an electric suspension.

51. The bicycle electrical system as recited in claim 1, wherein
at least one of the first and the second electric components is a drive unit comprising a motor for assisting a human power drive force which is inputted to a crank.

* * * * *